(12) United States Patent
Larson et al.

(10) Patent No.: US 9,343,885 B2
(45) Date of Patent: May 17, 2016

(54) SYSTEM AND METHOD FOR PROVIDING FINAL DROP IN A LIVING UNIT IN A BUILDING

(71) Applicant: 3M INNOVATIVE PROPERTIES COMPANY, St. Paul, MN (US)

(72) Inventors: Donald K. Larson, Cedar Park, TX (US); Wesley A. Raider, Hudson, WI (US)

(73) Assignee: 3M Innovative Properties Company, St. Paul, TX (US)

( * ) Notice: Subject to any disclaimer, the term of this patent is extended or adjusted under 35 U.S.C. 154(b) by 0 days.

(21) Appl. No.: 14/601,712

(22) Filed: Jan. 21, 2015

(65) Prior Publication Data

US 2015/0131953 A1 May 14, 2015

Related U.S. Application Data

(63) Continuation of application No. 12/847,644, filed on Jul. 30, 2010, now abandoned.

(60) Provisional application No. 61/231,714, filed on Aug. 6, 2009, provisional application No. 61/266,547, filed on Dec. 4, 2009, provisional application No. 61/354,519, filed on Jun. 14, 2010, provisional application No. 61/354,880, filed on Jun. 15, 2010.

(51) Int. Cl.
*G02B 6/44* (2006.01)
*F16L 3/10* (2006.01)
(Continued)

(52) U.S. Cl.
CPC .. *H02G 3/22* (2013.01); *F16L 3/04* (2013.01); *F16L 3/08* (2013.01); *F16L 3/10* (2013.01);
(Continued)

(58) Field of Classification Search
CPC ..... H02G 3/22; H02G 3/0437; H02G 3/0481; H02G 3/305; H02G 3/32; H02G 3/34; F16L 5/00; F16L 3/04; F16L 3/08; F16L 3/10; F16L 3/22; G02B 6/4441; G02B 6/4459; G02B 6/4466; Y10T 29/49826
USPC ........ 52/220.1, 220.2, 220.5, 220.8; 174/480, 174/481, 483, 503, 504, 68.1, 68.3; 248/65; 385/109
IPC .................... F16L 3/04, 3/10, 3/22; G02B 6/44
See application file for complete search history.

(56) References Cited

U.S. PATENT DOCUMENTS 319,112 A    6/1885  Nevius
2,066,242 A * 12/1936 Abbott ............................ 174/95
(Continued)

FOREIGN PATENT DOCUMENTS

DE      44 10 558 A1   9/1995
DE     196 03 262 A1   7/1997
(Continued)

OTHER PUBLICATIONS

Machine Tranlation FR 2418973 A1 Marandeau Pubn-Date: Sep. 28, 1979.*

(Continued)

*Primary Examiner* — Charles A Fox
*Assistant Examiner* — Joseph J Sadlon
(74) *Attorney, Agent, or Firm* — Gregg Rosenblatt

(57) ABSTRACT

A cable routing system is described. More specifically, described is a cable routing system that includes a main fiber channel configured to receive a drop fiber to allow it to fit within the main fiber channel, where the channel is surrounded by a discontinuous segmented duct, and the duct comprises a continuous flange structure to provide support for the system as it is installed on or fastened to a wall or other generally flat surface.

18 Claims, 15 Drawing Sheets

(51) Int. Cl.

| | | |
|---|---|---|
| *F16L 3/22* | (2006.01) | |
| *F16L 3/04* | (2006.01) | |
| *H02G 3/22* | (2006.01) | |
| *H02G 3/30* | (2006.01) | |
| *H02G 3/32* | (2006.01) | |
| *H02G 3/34* | (2006.01) | |
| *F16L 3/08* | (2006.01) | |
| *F16L 5/00* | (2006.01) | |
| *H02G 3/04* | (2006.01) | |

(52) U.S. Cl.
CPC ... *F16L 3/22* (2013.01); *F16L 5/00* (2013.01); *G02B 6/4441* (2013.01); *G02B 6/4459* (2013.01); *G02B 6/4466* (2013.01); *H02G 3/0481* (2013.01); *H02G 3/305* (2013.01); *H02G 3/32* (2013.01); *H02G 3/34* (2013.01); *H02G 3/0437* (2013.01); *Y10T 29/49826* (2015.01)

(56) References Cited

U.S. PATENT DOCUMENTS

| | | | | |
|---|---|---|---|---|
| 2,137,887 A | * | 11/1938 | Abbott | B26D 3/001 138/111 |
| 2,462,756 A | | 2/1949 | Leopold | |
| 2,916,540 A | | 12/1959 | Rostan | |
| 2,950,338 A | | 8/1960 | Taylor | |
| 3,110,753 A | | 11/1963 | Witort | |
| 3,133,753 A | | 5/1964 | Goodman et al. | |
| 3,363,050 A | * | 1/1968 | Martin | H02G 3/045 138/155 |
| 3,464,177 A | * | 9/1969 | Amato | E04F 19/0495 52/288.1 |
| 3,485,937 A | * | 12/1969 | Caveney | H02G 3/045 174/101 |
| 3,491,971 A | | 1/1970 | Fisher | |
| 3,576,304 A | * | 4/1971 | Gillemot | F16L 3/1226 24/306 |
| 3,654,379 A | | 4/1972 | Rodgers | |
| 3,778,528 A | | 12/1973 | Heifetz et al. | |
| 3,894,706 A | | 7/1975 | Mizusawa | |
| 4,136,257 A | * | 1/1979 | Taylor | H02G 3/045 174/68.3 |
| 4,308,418 A | | 12/1981 | Van Kuik et al. | |
| 4,459,165 A | | 7/1984 | Meis et al. | |
| 4,606,595 A | | 8/1986 | Dola | |
| 4,618,741 A | | 10/1986 | Bramwell | |
| 4,644,097 A | | 2/1987 | Johnsen et al. | |
| 4,800,588 A | | 1/1989 | Poster, Jr. | |
| 4,804,020 A | | 2/1989 | Bartholomew | |
| 4,810,833 A | | 3/1989 | Meyers | |
| 4,827,080 A | | 5/1989 | Castellani et al. | |
| 4,900,123 A | | 2/1990 | Barlow et al. | |
| 4,911,525 A | | 3/1990 | Hicks et al. | |
| 4,932,744 A | | 6/1990 | Messelhi | |
| 5,018,260 A | | 5/1991 | Ziu | |
| 5,032,690 A | | 7/1991 | Bloom | |
| 5,107,072 A | | 4/1992 | Morgan | |
| 5,367,122 A | | 11/1994 | de Olano | |
| 5,411,443 A | * | 5/1995 | Meier | F16G 13/16 191/12 C |
| 5,434,944 A | | 7/1995 | Kerry et al. | |
| 5,466,886 A | | 11/1995 | Lengyel et al. | |
| 5,530,785 A | | 6/1996 | Sakamoto et al. | |
| 5,593,756 A | | 1/1997 | Miller | |
| 5,678,609 A | | 10/1997 | Washburn | |
| 5,692,545 A | | 12/1997 | Rodrigue | |
| 5,702,994 A | | 12/1997 | Klosel | |
| 5,721,394 A | | 2/1998 | Mulks | |
| 5,778,130 A | | 7/1998 | Walters et al. | |
| 5,886,295 A | * | 3/1999 | Carino et al. | 174/481 |
| 5,898,134 A | * | 4/1999 | Fallin | H02G 3/26 174/135 |
| 6,172,298 B1 | | 1/2001 | Norvelle | |
| 6,307,152 B1 | | 10/2001 | Bonilla et al. | |
| 6,332,479 B1 | | 12/2001 | Ko | |
| 6,372,987 B1 | | 4/2002 | Ha | |
| 6,427,953 B1 | | 8/2002 | Dickens | |
| 6,462,277 B1 | | 10/2002 | Young et al. | |
| 6,504,098 B2 | | 1/2003 | Seamans | |
| 6,541,089 B1 | * | 4/2003 | Hamerski et al. | 428/40.1 |
| 6,552,262 B2 | | 4/2003 | English et al. | |
| 6,567,601 B2 | | 5/2003 | Daoud et al. | |
| 6,911,597 B2 | | 6/2005 | Seamans et al. | |
| 6,916,986 B1 | | 7/2005 | Herzog et al. | |
| 7,035,511 B1 | * | 4/2006 | Rhoney et al. | 385/100 |
| RE39,097 E | | 5/2006 | Schilham | |
| 7,078,616 B2 | | 7/2006 | Roesch et al. | |
| 7,119,280 B1 | * | 10/2006 | Ray et al. | 174/72 A |
| 7,220,144 B1 | | 5/2007 | Elliot et al. | |
| 7,228,036 B2 | | 6/2007 | Elkins et al. | |
| 7,257,466 B2 | | 8/2007 | Kreiner | |
| 7,301,100 B2 | | 11/2007 | Drane et al. | |
| 7,341,403 B2 | | 3/2008 | Tsuchiya et al. | |
| 7,346,253 B2 | | 3/2008 | Bloodworth et al. | |
| 7,369,738 B2 | | 5/2008 | Larson et al. | |
| 7,394,963 B2 | | 7/2008 | Hartlef | |
| 7,397,993 B1 | | 7/2008 | Navé et al. | |
| 7,406,241 B1 | | 7/2008 | Opaluch et al. | |
| 7,418,812 B2 | * | 9/2008 | Ikeda | F16G 13/16 248/49 |
| 7,668,432 B2 | | 2/2010 | Mullaney | |
| 7,756,379 B2 | | 7/2010 | Kowalczyk et al. | |
| 7,832,161 B2 | * | 11/2010 | Ligabue | E04F 13/142 428/157 |
| 8,050,527 B2 | * | 11/2011 | Noddings | 385/100 |
| 8,091,300 B2 | | 1/2012 | Pyo | |
| 8,107,785 B2 | | 1/2012 | Berglund et al. | |
| 8,203,078 B1 | * | 6/2012 | Fulco | H02G 3/0431 138/118.1 |
| 8,283,562 B2 | | 10/2012 | Clifton et al. | |
| 2002/0181905 A1 | | 12/2002 | Yoshida et al. | |
| 2003/0049008 A1 | * | 3/2003 | Zeidan | 385/136 |
| 2005/0213920 A1 | | 9/2005 | Tanaka et al. | |
| 2008/0017397 A1 | * | 1/2008 | Komiya | H02G 3/0475 174/24 |
| 2008/0069513 A1 | | 3/2008 | Desanti | |
| 2008/0092470 A1 | * | 4/2008 | Jackson | E04F 19/0436 52/288.1 |
| 2008/0159740 A1 | | 7/2008 | Bell et al. | |
| 2008/0187276 A1 | | 8/2008 | Roberts et al. | |
| 2008/0202808 A1 | | 8/2008 | Tambe | |
| 2008/0203247 A1 | | 8/2008 | Hill | |
| 2008/0226236 A1 | | 9/2008 | Pepin et al. | |
| 2009/0003782 A1 | | 1/2009 | Bell et al. | |
| 2009/0014209 A1 | | 1/2009 | Forbis | |
| 2009/0060445 A1 | | 3/2009 | Mullaney et al. | |
| 2009/0211171 A1 | | 8/2009 | Summers | |
| 2009/0223025 A1 | * | 9/2009 | Cyrluk | B60P 7/0869 24/130 |
| 2009/0236098 A1 | | 9/2009 | Mestemacher et al. | |
| 2009/0294016 A1 | | 12/2009 | Sayres et al. | |
| 2010/0109174 A1 | | 5/2010 | Abernathy et al. | |
| 2010/0243096 A1 | | 9/2010 | Berglund et al. | |
| 2010/0247052 A1 | | 9/2010 | Berglund et al. | |
| 2013/0025929 A1 | | 1/2013 | Dower et al. | |

FOREIGN PATENT DOCUMENTS

| | | | |
|---|---|---|---|
| DE | 198 43 263 A1 | 3/2000 | |
| EP | 0 396 181 A1 | 11/1990 | |
| EP | 0 490 609 A2 | 6/1992 | |
| EP | 0 992 826 A2 | 4/2000 | |
| EP | 1 035 385 A1 | 8/2000 | |
| EP | 1 447 893 A1 | 8/2004 | |
| EP | 1 944 886 A1 | 7/2008 | |
| FR | 1 304 739 A1 | 8/1962 | |
| FR | 2 097 002 A1 | 3/1972 | |
| FR | 2 141 599 A1 | 1/1973 | |
| FR | 2 418 973 A1 | 9/1979 | |
| FR | 2418973 A * | 11/1979 | H02G 3/266 |
| FR | 2 568 730 A1 | 2/1986 | |
| FR | 2 688 897 B1 | 9/1993 | |

(56) References Cited

FOREIGN PATENT DOCUMENTS

| | | | |
|---|---|---|---|
| FR | 2 916 284 A1 | | 11/2008 |
| GB | 2 352 867 A | | 2/2001 |
| GB | 2 377 089 A | | 12/2002 |
| GB | 2 409 587 A | | 6/2005 |
| JP | 59-031902 A | | 2/1984 |
| JP | 4016262 B2 | | 12/2007 |
| JP | 2008-309894 A | | 12/2008 |
| JP | 2013187980 A | * | 9/2013 |
| KR | 20-0399079 Y1 | | 10/2005 |
| WO | 83/01868 | | 5/1983 |
| WO | 85/04981 | | 11/1985 |
| WO | 93/14545 | | 7/1993 |
| WO | 97/44872 | | 11/1997 |
| WO | 03/046622 | | 6/2003 |
| WO | 2005/096054 | | 10/2005 |
| WO | 2008/124293 | | 10/2008 |
| WO | 2009/018421 | | 2/2009 |
| WO | 2009/158346 | | 12/2009 |
| WO | 2010/068585 | | 6/2010 |

OTHER PUBLICATIONS

Publication: "Flat Cable System is Introduced," 3M Megaphone Newspaper, Dec. 1962; 1 page.
Publication: "New Flat Cable is Available," 3M Megaphone Newspaper, Jun. 1964; 1 page.
Publication: "3M Cable Unsnarls Wiring Woes with the Neat System," The Tartan Magazine, 3rd Quarter 1965; 3 pp.
Form PCT/ISA/210, dated Oct. 28, 2011, issued in PCT/US2010/043952.
Form PCT/ISA/210, Dated Oct. 28, 2011, issued in PCT/US2010/043959.
Search Report for Appl. No. CN201080034855.6, mailed on Feb. 18, 2014, 1 page.
Search Report for ROC (Taiwan) Appl. No. 099126156, mailed on Nov. 17, 2014, 1 page.
Search Report for ROC (Taiwan) Appl. No. 099126157, mailed on Nov. 17, 2014, 1 page.

* cited by examiner

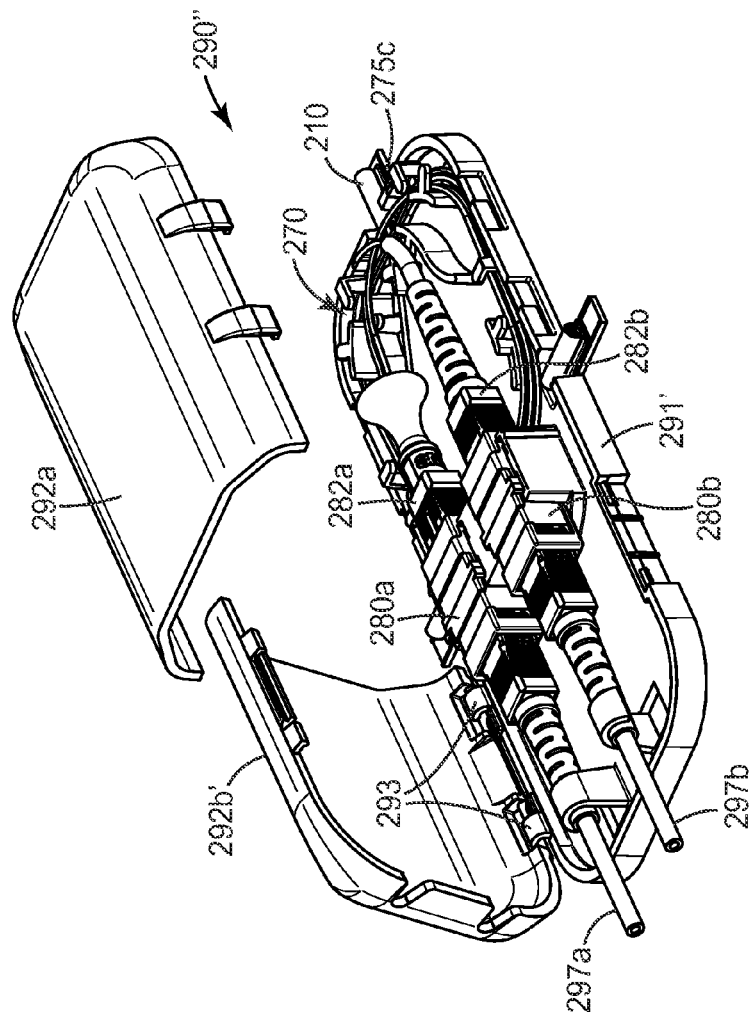
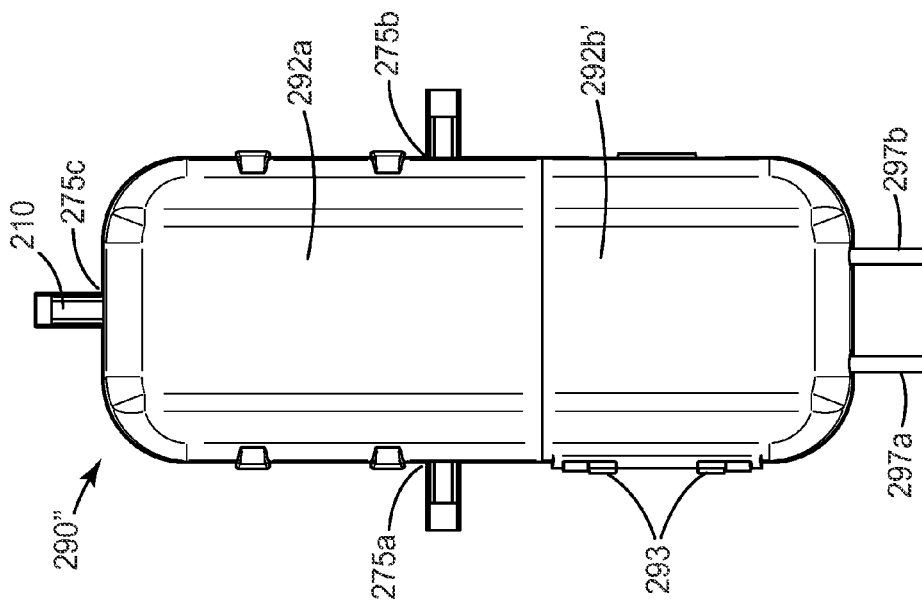
FIG. 8B
FIG. 8A

SYSTEM AND METHOD FOR PROVIDING FINAL DROP IN A LIVING UNIT IN A BUILDING

CROSS REFERENCE TO RELATED APPLICATIONS

This application is a continuation of U.S. patent application Ser. No. 12/847,644, filed Jul. 30, 2010, now pending, which claims the benefit of U.S. Provisional Application Ser. No. 61/231,714, filed Aug. 6, 2009; U.S. Provisional Application Ser. No. 61/266,547 filed on Dec. 4, 2009; U.S. Provisional Application Ser. No. 61/354,519 filed on Jun. 14, 2010; and U.S. Provisional Application Ser. No. 61/354,880 filed on Jun. 15, 2010. The disclosures of each of the aforementioned applications are incorporated by reference herein in their entirety.

BACKGROUND OF THE INVENTION

1. Field of the Invention

The present invention is directed to a system for providing a final drop within a living unit of a multi-dwelling unit.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced or otherwise connected to the riser cable in the FDT only as service is requested from a tenant in a living unit. These service installations require multiple reentries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser with a single extended drop cable. This approach creates several challenges, including the necessity of first installing a pathway to manage, protect and hide each of the multiple drop cables. This pathway often includes very large (e.g., 2 inch to 4 inch to 6 inch) pre-fabricated crown molding made of wood, composite, or plastic. Many of these pathways, over time, become congested and disorganized, increasing the risk of service disruption due to fiber bends and excessive re-entry.

In addition, further physical and aesthetic challenges exist in providing the final drop to and from each individual living unit. Also, because of their size, many conventional indoor optical network terminals (ONTs) are often placed in the closets of living units out of normal view. This type of arrangement requires that a service provider run new cabling (such as coaxial cables, cat 5 cables, and others) from the closet to the existing wiring in the living unit to activate the ONT to provide service. As newer ONTs have become smaller in physical size, they can be placed outside of closets and into main living areas.

SUMMARY

According to an exemplary aspect of the present invention, a system for providing a final drop in a living unit in a building comprises a point-of-entry unit disposed within the living unit at a location corresponding to an access position of horizontal cabling disposed in a hallway of the building that provides a first anchor point. The system also includes an adhesive-backed duct, having one or more communication lines disposed therein, mountable to a wall within the living unit. The system also includes a second anchor point disposed within the living unit to receive a first communication line via the duct.

In one aspect, the point-of-entry unit comprises a low profile access base unit disposed within the living unit at a location corresponding to an access position of horizontal cabling disposed in a hallway of the building.

In another aspect, the second anchor point includes a wall receptacle to receive a first line via the duct.

In another aspect, the duct comprises a conduit portion having a bore formed along a longitudinal axis of the duct to hold at least a first drop fiber and a flange structure, wherein adhesive backing is disposed on a rear surface of the flange structure.

In another aspect, at least the first drop fiber is terminated via an optical connector.

In another aspect, the base unit includes a wall mounting portion and a low profile cover, the cover being mountable over or onto at least a portion of the duct, the wall mounting portion including a main port to fit over a hole formed in the first wall, the structure having a fiber slack storage area disposed between the wall mounting portion and the cover.

In another aspect, the conduit is formed centrally with respect to a lateral plane of the flange structure.

In another aspect, the duct further includes a support duct disposed on the adhesive backing, the support duct including a strength member channel disposed centrally and extending lengthwise therethrough.

In another aspect, the strength member channel includes at least one of an aramid yarn, a metallic wire, a fiberglass member, and Kevlar material.

In another aspect, the duct is formed from a clear polymeric material.

In another aspect, the duct comprises a plurality of conduit portions, with each conduit portion having a bore formed along a longitudinal axis of the duct, and wherein each conduit portion houses at least one separate drop fiber.

In another aspect, the duct also carries an electrical wire.

In another aspect, the wall receptacle includes at least one connector terminated with the first drop fiber and a coupling that couples the terminated first drop fiber to a jumper cable. Further, the wall receptacle includes a first cover portion and a second cover portion that are openable and closable independent of each other.

In another aspect, the adhesive backing comprises a pressure sensitive adhesive.

In another aspect, the duct includes multiple conduits each having a bore formed along a longitudinal axis of the duct, wherein a first conduit is configured to hold a first drop fiber and a second conduit is configured to hold a second drop fiber.

In another aspect, the duct has a lateral dimension from about 0.2 inches to about 1 inch, and a height of less than about 0.1 inch to about 0.5 inches.

In another aspect, an inner diameter of the bore is about 20% or less larger than an outer diameter of the drop fiber disposed therein.

In another aspect, the conduit portion further includes a strength member disposed therein.

In another aspect, the duct comprises a conduit portion having a bore formed longitudinally therein, the conduit portion attached to a flange structure via a thin web of material having a thickness such that upon modest application of a peeling force, a segment of the conduit portion can be detached or peeled away from the flange structure. In another aspect, the thin web of material has a thickness of from about 10% to about 30% of the thickness of the flange structure.

In another aspect, the conduit portion is formed in the same bending plane as the flange structure.

In another aspect, the conduit portion is attached to a central portion of flange structure.

In another aspect, the conduit portion comprises dual conduit portions having the flange structure disposed in between, each of the conduit portions attached to the flange structure via a thin web of material, wherein the conduit portions are formed in the same bending plane as the flange structure.

In a further aspect, the duct comprises a conduit portion having a bore formed along a longitudinal axis of the duct to hold at least the first drop fiber, the conduit portion having a longitudinal slot formed therein to provide for insertion and removal of the first drop fiber.

In another aspect, the duct also includes a flange structure having a first flange extending along the longitudinal axis of the duct and extending laterally outward from the conduit portion in a first direction and a second flange extending along the longitudinal axis of the duct and extending laterally outward from the conduit portion in a second direction.

In another aspect, the duct also includes a first recess portion disposed between the conduit portion and the first flange and a second recess portion disposed between the conduit portion and the second flange.

In another aspect, a system for providing a final drop to a living unit in a building comprises a point-of-entry unit disposed within the living unit at a location corresponding to an access position of horizontal cabling disposed in a hallway of the building that provides a first anchor point. The system also includes an optically clear or translucent adhesive tape, having a drop fiber with a clear buffer coating, mountable to a wall within the living unit, wherein the drop fiber is disposed between an adhesive portion of the optically clear or translucent adhesive tape and the wall. The system also includes second anchor point disposed within the living unit to receive the drop fiber via the optically clear adhesive tape.

In another aspect of the invention, a method of providing a final drop in a living unit in a building comprises establishing a service line point of entry in the living unit, the service line communicating with a telecommunications service provider. The method also includes providing an adhesive-backed duct, pre-populated with one or more drop lines and mountable to a wall within the living unit, wherein a first drop line is coupled to the service line. The method also includes mounting the adhesive-backed duct to the living unit wall and coupling the first drop line to an anchor point disposed in the living unit at a distance from the point of entry.

In another aspect, the first drop line comprises an optical fiber.

In another aspect, the adhesive-backed duct spans the entire distance between the service line point of entry and the wall receptacle.

In another aspect, the method further comprises providing a jumper to connect the wall receptacle to an optical network terminal (ONT).

In another aspect, the building is an MDU. In another aspect, the anchor point comprises a wall receptacle.

In another aspect, establishing a service line point of entry in the living unit comprises mounting a low profile access base unit at a location in the living unit corresponding to an access position of horizontal cabling disposed in a hallway of the building.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 8A and 8B are different views of another alternative wall receptacle according to another aspect of the invention.

Figure 1A:
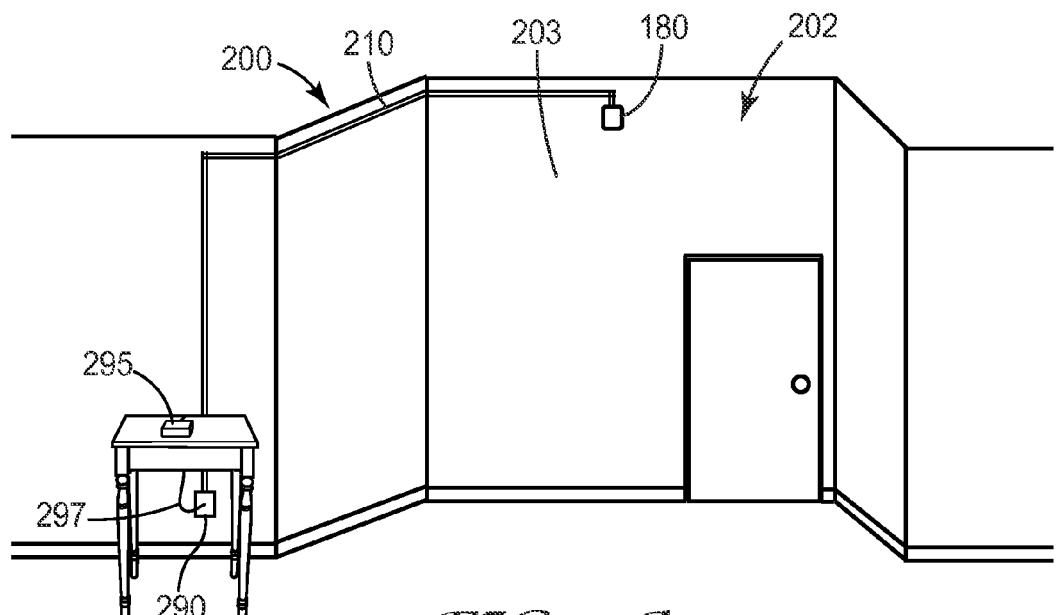
FIG. 1A is a schematic view of an exemplary final drop system according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a system for providing a final drop in a living unit in a premise or building, such as an MDU (which for purposes of this application can include a typical MDU, multiple tenant unit (MTU), school, hotel, hospital or other location). In addition, the term "living unit" is not limited to a domicile or residence, but can include an office, conference room, hotel room, hospital room, school room or other similar room, whether or not continuously occupied. The various system components described herein are designed to provide telecommunications service within individual living units, such as residences, classrooms, or offices, within the building. The components of the system are also designed with very low impact profiles for better aesthetics within the living unit so that a drop fiber can be discretely mounted within the open space of a living unit.

Figure 2:
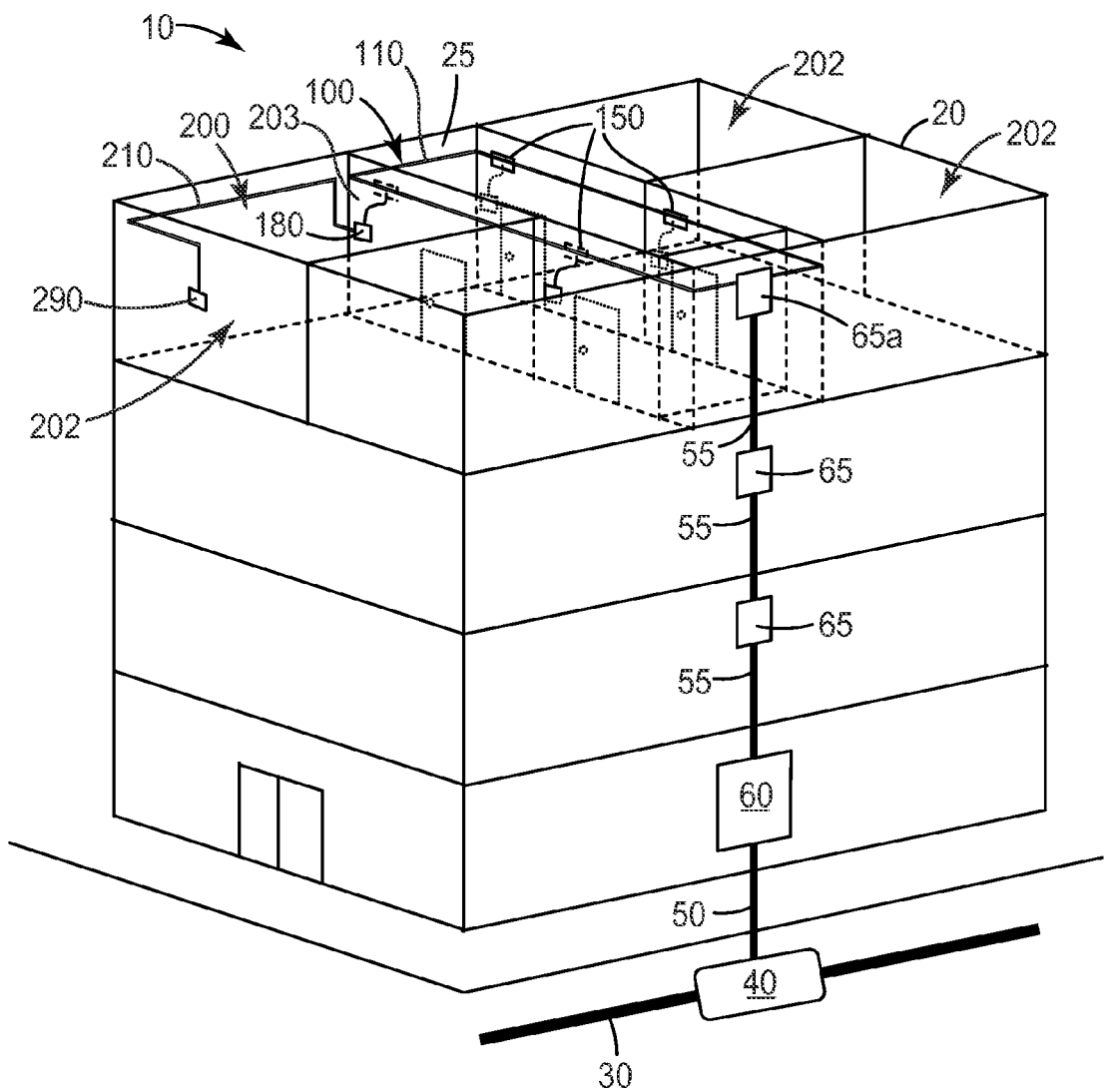
FIG. 2 is a schematic view of an exemplary MDU having a drop access location system and a final drop system according to an aspect of the present invention.

FIG. 1A shows a schematic view of a system 200 for providing a final drop that is installed in a living unit 202 of an exemplary building, such as MDU 10 (see FIG. 2). Please note that while system 200 is preferably utilized in a building such as an MDU, it may also be utilized in a single family home or similar residence, as would be apparent to one of ordinary skill in the art given the present description.

The system 200 includes a conduit or duct 210 which contains one or more communications lines (such as drop fibers or lines, not shown in FIG. 1A) for connection with the horizontal cabling/service line(s) of the building, such as an MDU. The communications lines preferably comprise one or two optical fibers, although an electrical wire, coaxial/microcoaxial cable, or a combination of these, may be used for data, video, and/or telephone signal transmission. In one aspect, a communications line can comprise a discrete (loose) drop fiber, such as 900 μm buffered fiber, 500 μm buffered fiber, 250 μm fiber, or other standard size communications fiber. The optical fiber can be single mode or multi-mode. Example multi-mode fibers can have a 50 μm core size, a 62.5 μm core size, an 80 μm core size, or a different standard core size. In another alternative aspect, the drop fiber can comprise a conventional plastic optical fiber. The final drop fiber(s) can be field terminated with an optical fiber connector, such as described in U.S. Pat. No. 7,369,738. Other optical fiber connectors, such as SC-APC, SC-UPC, or LC, can be utilized.

In addition, although the exemplary aspects described herein are often specific to accessing optical fiber lines, it would be understood by one of ordinary skill in the art given the present description that the system 200 can be configured to accommodate an electrical wire drop and/or a hybrid combination drop as well. For example, the electrical wire drop can comprise conventional Cat5/Cat 6 wiring or conventional coax wiring, such as RG6 shielded and/or unshielded cables.

System 200 comprises one or more point-of-entry units located at one or more access location points within the living unit to provide access to the horizontal cabling provided within the MDU. In a preferred aspect, a point of entry unit comprises a low profile access base unit 180, mountable over or onto at least a portion of the duct 210, that is located at an access location point. In an alternative aspect, the point of entry unit can comprise a funnel or other similar structure located at an access location point that provides an anchor point for the service line to enter the living unit.

In a preferred aspect, the service line point of entry can be established by disposing unit 180 on a living unit wall 203 as shown in FIG. 1A at an access position corresponding to horizontal cabling that is disposed in the hallway of the building. An exemplary drop access system and method of installing the horizontal cabling provided within the MDU is described in U.S. Patent Publication No. 2009-0324188, incorporated by reference herein in its entirety.

Figure 1B:
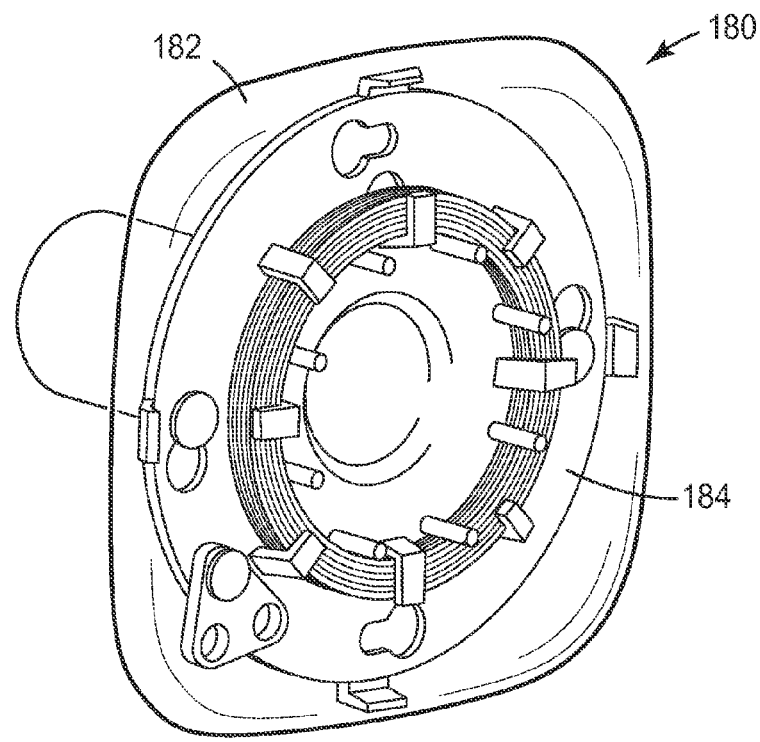
FIG. 1B is an isometric view of an exemplary low profile access base unit according to an aspect of the present invention.

As shown in FIG. 1B, the low profile access base unit 180 includes a cover 182 and a wall-mounting portion 184. The cover 182 can have a low profile (with a circular, oval, rectangular, or other geometric outer shape) and/or decorative outer design for aesthetics within the living unit. The wall mounting portion 184 is located over the service fiber access point-of-entry within the living unit and provides structural support for the cover 182. The wall mounting portion includes a main port to fit over or into a hole formed in a wall 203 of the living unit 202 that leads to the service fiber(s) of the horizontal cabling. The wall mounting portion 184 can also provide a slack storage section formed along a perimeter portion of an outer facing surface thereof. This slack storage provides for storing excess amounts of the drop line. For example, a series of tabs or other structures disposed near or at a perimeter of the wall mounting portion 184 can be disposed thereon and can be configured to loosely secure excess fiber around the perimeter of the wall mounting portion. The fiber can be protected from over-bending by configuring the wall mounting portion to have a suitable radius or width. As an example, low profile access structure 180 can be designed as a low profile base unit for a drop fiber point of entry system, such as is described in the U.S. Pat. No. 8,295,670, incorporated by reference herein in its entirety.

In one aspect, the drop fiber(s) can be coupled to the service provider line via a standard coupling located in a drop access box 150 (see FIG. 2) disposed in a hallway of the MDU. Alternatively, the drop fiber(s) can be coupled to the service provider line via a standard coupling located between the hallway wall and the interior wall 203 of the living unit, as is described in U.S. Pat. No. 8,295,670, incorporated by reference above. In a further alternative, the low profile access base/point-of-entry unit 180 can include a standard coupling to couple the drop fiber(s) to the service provider line, such as when the service provider line is provided as a jumper from a central closet or similar location to the living unit or room.

The drop fiber(s), such as a terminated drop fiber(s), can be carried from the point-of-entry unit, such as low profile access base unit 180, to a second anchor point within the living unit, in a preferred aspect, wall receptacle 290, via low profile duct 210. In a preferred aspect, the duct 210 is disposed along a wall, ceiling, under carpet, floor, or interior corner of the living unit in an unobtrusive manner, such that the aesthetics of the living unit are minimally impacted. For example, FIG. 3C shows a duct 310 installed at the corner formed by a wall and a ceiling to create a minimal visual impact.

As mentioned previously, system 200 includes a second anchor point at a distance from the point-of-entry to receive the drop fiber(s) and provide a connection with an optical network terminal (ONT) that is located within the living unit. In a preferred aspect, the second anchor point comprises a wall receptacle unit 290 that is configured to receive the drop fiber(s) and provide a connection with an ONT 295, such as a single family unit optical network terminal (SFU ONT), desktop ONT, or similar device (e.g., a 7342 Indoor Optical Terminal, available from Alcatel-Lucent or a Motorola ONT1120GE Desktop ONT). The wall receptacle 290 can be configured to provide one or more fiber connections using a conventional SC/APC connector(s) and/or jumpers 297 to the ONT 295. In one aspect, the wall receptacle can be placed from about 6 inches to about 10 inches, preferably about 8 inches, from the floor of the living unit. The wall receptacle 290 can also accommodate one or more data lines or electrical connections. An exemplary wall receptacle is described in Patent Publication No. WO 2008/124293, incorporated by reference in its entirety.

In an alternative aspect, a structure such as wall receptacle 290 can be omitted, as the drop fiber(s) can be terminated and accessed from the duct 210 directly to the ONT 295.

Figure 7B:
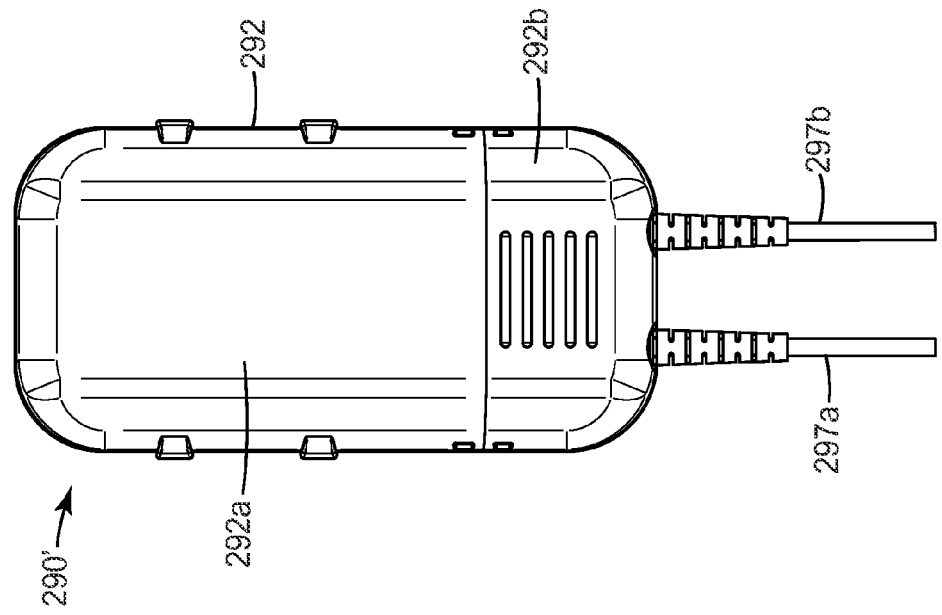
FIGS. 7A and 7B are different views of an alternative wall receptacle according to another aspect of the invention.
Figure 7A:
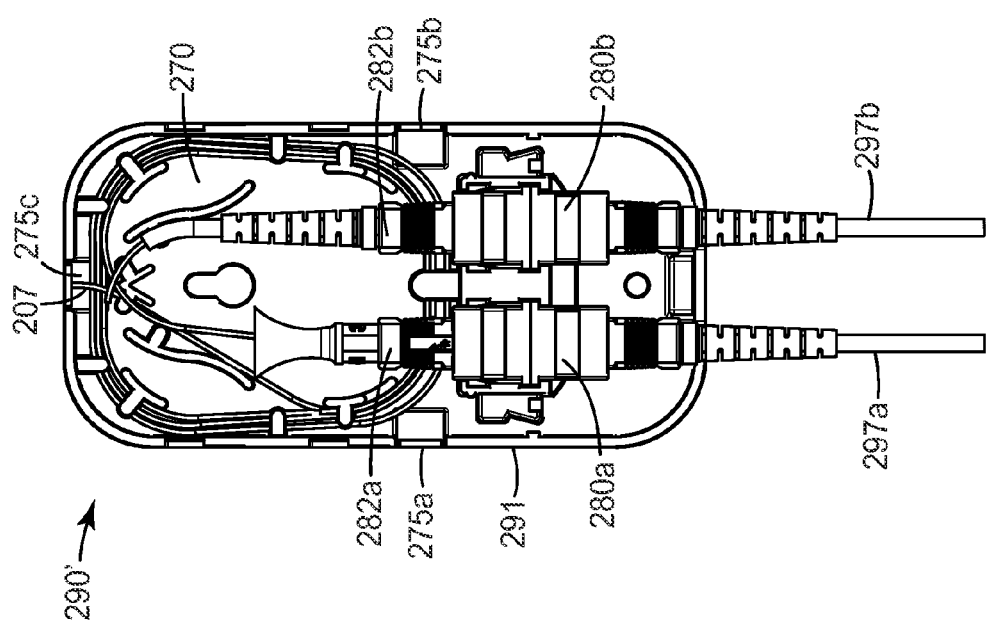

In a further alternative aspect, another exemplary wall receptacle is shown in FIGS. 7A and 7B. Wall receptacle 290' can comprise a metal, plastic, or other suitably robust material, preferably having a low profile. In this exemplary aspect, wall receptacle 290' includes a base portion 291 and a cover 292. In a preferred aspect, the cover 292 may comprise more than one cover, such as separate covers 292a and 292b shown in FIG. 7B. In this manner, certain portions of the interior of wall receptacle 290' can be excluded from access, when appropriate. The covers 292a, 292b can be can be attached to base 291 via different types of attachment, such as friction fit, latch fit, sliding fit, or hinged attachment. For example, in FIG. 7B, cover 292b can be attached via a sliding fit. In one alternative aspect, cover 292b can be configured to slide underneath cover 292a when opened.

The wall receptacle 290' is configured to receive one or more drop fibers 207 and provide a connection with an ONT (see e.g., ONT 295). In the example of FIG. 7A, drop fiber 207 is field terminated with an optical fiber connector. If more than one drop fiber is utilized, the wall receptacle can include more than one connector. In this example, wall receptacle 290' includes two connectors 282a, 282b. For example, connectors 282a, 282b can each comprise an optical fiber connector that includes a pre-polished fiber stub disposed in ferrule that is spliced to a field fiber with a mechanical splice, such as described in U.S. Pat. No. 7,369,738. The drop fiber(s) 207 can be coupled to an ONT jumper cable(s) 297a, 297b via coupling or adapter 280a, 280b. Other conventional connectors can be utilized, as would be apparent to one of ordinary skill in the art given the present description. The exemplary couplings 280a, 280b, can be mounted within the coupling mounting area of base 291. Each of the couplings 280a, 280b can comprise a conventional in-line optical fiber coupler or adapter. In a preferred aspect, each of the couplings 280a, 280b can incorporate a built-in shutter so that when the connector/jumper 297a, 297b is unplugged, the shutter door automatically closes and provides light safety to protect the user from potential eye damage caused by laser light.

In this preferred aspect, the couplings 280a, 280b are mounted well within the receptacle 290' such that only the boot portion of the jumper cables 297a, 297b is exposed when cover 292b is placed in a closed position. This configuration can reduce accidental strains being placed on the cable, whereas an exposed connector, such as one inserted at a port formed at the outer wall of the receptacle, can be subject to additional strains.

The wall receptacle 290' can further include a fiber slack storage section 270 to route the accessed fiber. In this example, drop fiber 207 can be routed along one or more fiber guides and can be protected from over-bending by bend radius control structures formed in or on the base 291 in the fiber slack storage section.

In another aspect, drop fiber 207 can enter wall receptacle 290' via one of the break out doors 275a, 275b, or 275c (in the specific example of FIG. 7A, drop fiber 207 enters wall receptacle 290' via door 275c).

In yet another aspect of the invention, exemplary wall receptacle 290" is shown in FIGS. 8A and 8B. Wall receptacle 290" can comprise a metal, plastic, or other suitably robust material, preferably having a low profile. In this exemplary aspect, wall receptacle 290" includes a base portion 291' and a cover that comprises multiple covers, such as separate covers 292a and 292b' shown in FIG. 8B. The covers 292a, 292b' can be can be attached to base 291' via different types of attachment, such as friction fit, latch fit, sliding fit, or hinged attachment. For example, cover 292b' can be attached to base 291' via a hinged attachment, utilizing exemplary hinges 293 (see FIG. 8A).

Similar to the receptacle 290', wall receptacle 290" is configured to receive one or more drop fibers and provide a connection with an ONT (see e.g., ONT 295). In this example, the drop fiber can be field terminated with an optical fiber connector. In this example, wall receptacle 290" includes two connectors 282a, 282b. The drop fiber(s) can be coupled to an ONT jumper cable 297a, 297b via a coupling or adapter 280a, 280b. The exemplary couplings 280a, 280b, can be mounted within the coupling mounting area of base 291'. In this preferred aspect, the couplings 280a, 280b are mounted further within the receptacle 290" such that the entire connector/boot portions of the jumper cables 297a, 297b are disposed within receptacle 290" when cover 292b' is placed in a closed position. This configuration can provide more aesthetic appeal in some settings and provides tamper resistance.

The wall receptacle 290" can further include a fiber slack storage section 270 to route the accessed fiber. Further, the drop fiber carried within duct 210 can enter wall receptacle 290" via any one of the break out doors 275a, 275b, or 275c.

FIG. 2 shows an example building, here MDU 10, with an exemplary drop access system to provide horizontal cabling to each individual living unit 202. MDU 10 is a multi-floor structure having a plurality of living units 202 located therein. For example, floor 20 has four living units having a common hallway 25. Feeder cable 30 brings communications lines to and from building 10. These feeder lines are spliced to the MDU's cabling system at a splice closure 40. The building feeder lines 50 are distributed to the building to a distribution hub (FDH) 60 in the building. Each floor includes a fiber distribution terminal (FDT) 65 that receives communications lines via riser cable 55. In the present example, a drop access system 100 coupling the communications lines from FDT 65*a* can be installed on hallway 25 such as is described U.S. Patent Publication No. 2009-0324188, incorporated by reference above, where drop access boxes 150 can be disposed outside each living unit and can receive one or more fiber optic communication lines from duct 110.

As also mentioned above, the drop access location system can be configured to accommodate electrical wire drops and hybrid combination drops as well. In alternative aspects, the drop access location system can be configured to supply at least one of uninterrupted DC power and AC power to the wall receptacle or an ONT located in an individual living unit.

Figure 3A:
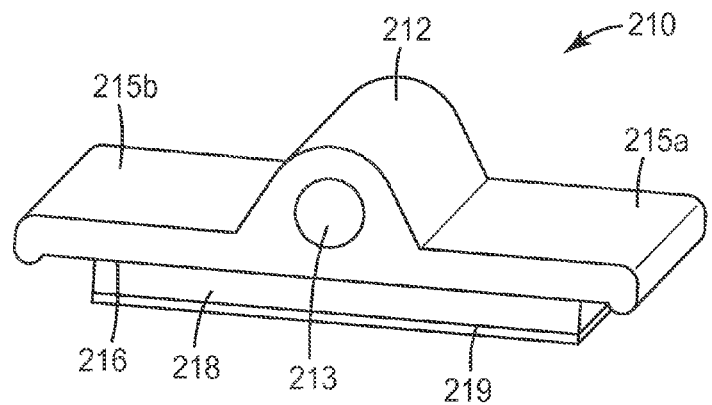
FIG. 3A is an isometric view of a first exemplary duct according to another aspect of the invention.

In more detail, a close-up isometric view of an exemplary duct 210 is shown in FIG. 3A. While system 200 is described herein as being implemented with a duct 210, it is noted that other types of duct designs, especially ducts 210', 310, 410, 510, 610, 710, 810, 910, and 1010, as described in more detail below, can be utilized in system 200. In some aspects, these ducts can be installed in the living unit using an installation tool such as is described in U.S. Patent Publication No. 2009-0324188, incorporated by reference above.

In the example of FIG. 3A, duct 210 includes a conduit portion 212 having a bore 213 extending longitudinally therethrough. The bore is sized to accommodate one or more communications lines disposed therein. In a preferred aspect, the duct 210 comprises one or two communications lines, such as buffer coated optical fibers. In use, the duct 210 can be pre-populated with one or more communications lines. In addition, duct 210 may also be populated with at least one electrical power line. In one exemplary aspect, the inner diameter of bore 213 is sized to be just slightly larger (e.g., about 20% larger or less) than the outer diameter of the communications line disposed therein. In another aspect, the conduit portion can include a strength member, such as Kevlar yarn.

While conduit portion 212 can have a generally circular cross-section, in alternative embodiments it may have another shape, such as a rectangle, square, triangle, oval, or other polygonal shaped cross-section. In one aspect, duct 210 is a continuous structure formed from a polymeric material such as polyvinyl chloride (PVC), making it flexible, flame retardant and robust. In one aspect, duct 210 can comprise an exemplary material such as a polyurethane elastomer, e.g., Elastollan 1185A10FHF (available from BASF, Florham Park, N.J.). As such, duct 210 can be guided and bent around corners and other structures without cracking or splitting. Duct 210 can be continuously formed using a conventional extrusion process. Duct 210 can have a relatively compact shape, with a lateral dimension from about 0.2 inches to about 1 inch, and a height of less than about 0.1 inch to about 0.5 inches.

Figure 3B:
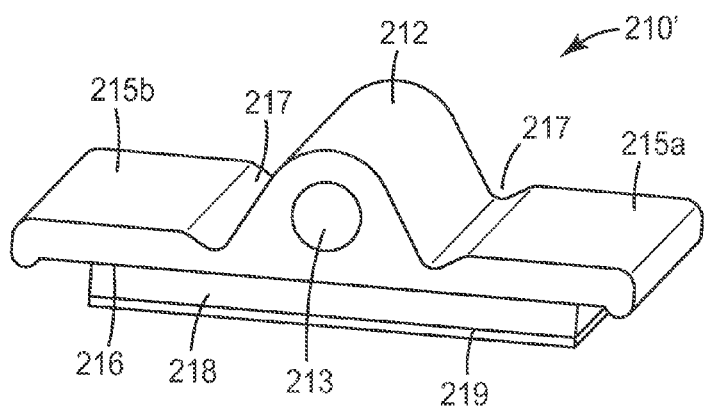
FIG. 3B is an isometric view of another exemplary duct according to another aspect of the invention.
Figure 3C:
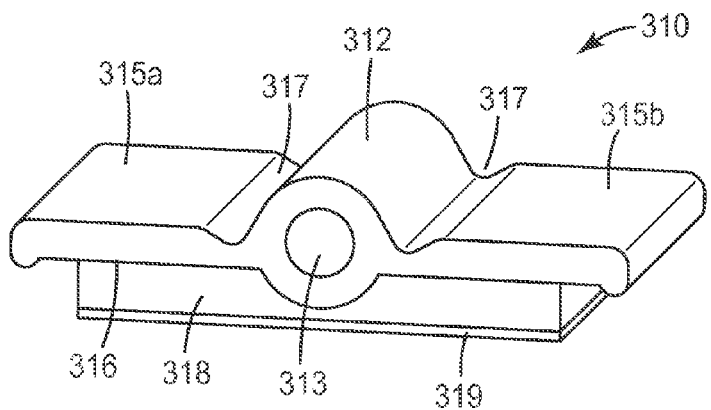
FIG. 3C is an isometric view of another exemplary duct according to another aspect of the invention.

Duct 210 also includes a generally flat flange structure having a first flange 215*a* and a second flange 215*b* extending laterally from the conduit portion to provide support for the duct 210 as it is installed on or fastened to a wall or other generally flat surface, such as a wall, floor, ceiling, or molding. In this aspect, the flange structure extends along the longitudinal axis of the duct and extends outward (in a wing shape) in both lateral directions. In this aspect, the conduit portion 212 is formed centrally with respect to the first and second flanges 215*a*, 215*b*. In addition, as is shown in FIG. 3B, an alternative duct 210' can further include dual recess portions 217 formed between the conduit 212 and the flanges 215*a*, 215*b*. The recessed portions can provide further duct flexibility for corner installation and bending.

In a preferred aspect, as shown in FIG. 3A, the duct 210 includes a rear surface 216 that can have a generally flat surface shape. The rear surface provides suitable surface area for adhering the duct 210 to a mounting surface, a wall or other surface (e.g., a dry wall, concrete, or other conventional building material) using an adhesive, such as a pressure sensitive adhesive, such as a transfer adhesive or double-sided tape. For example, in a preferred aspect of the present invention, the adhesive backing 218 comprises a pressure sensitive adhesive, such as a transfer adhesive or double-sided tape, disposed on all or at least part of surface 216. These types of adhesives do not exhibit macroscopic flow behavior upon application to a mounting surface and thus do not substantially change dimensions upon application to the mounting surface. In this manner, the aesthetic quality of the applied duct is maintained. Alternatively, adhesive backing 218 can comprise an epoxy.

In one aspect, surface 216 is backed with an adhesive backing 218 having a removable liner 219. In use, the liner can be removed and the surface 216 can be applied to a mounting surface via adhesive 218. For example, an adhesive such as a factory applied 3M™ VHB™ Tape 4941F can be utilized as adhesive backing 218. In another aspect, adhesive layer 218 comprises a removable adhesive, such as a stretch release adhesive. By "removable adhesive" it is meant that the duct 210 can be mounted to a mounting surface (preferably, a generally flat surface, although some surface texture and/or curvature are contemplated) so that the duct 210 remains in its mounted state until acted upon by an installer/user to remove the duct from its mounted position. Even though the duct is removable, the adhesive is suitable for those applications where the user intends for the duct to remain in place for an extended period of time. Suitable removable adhesives are described in more detail in U.S. Patent Appl. No. 61/324,147, incorporated by reference herein in its entirety.

Figure 9A:
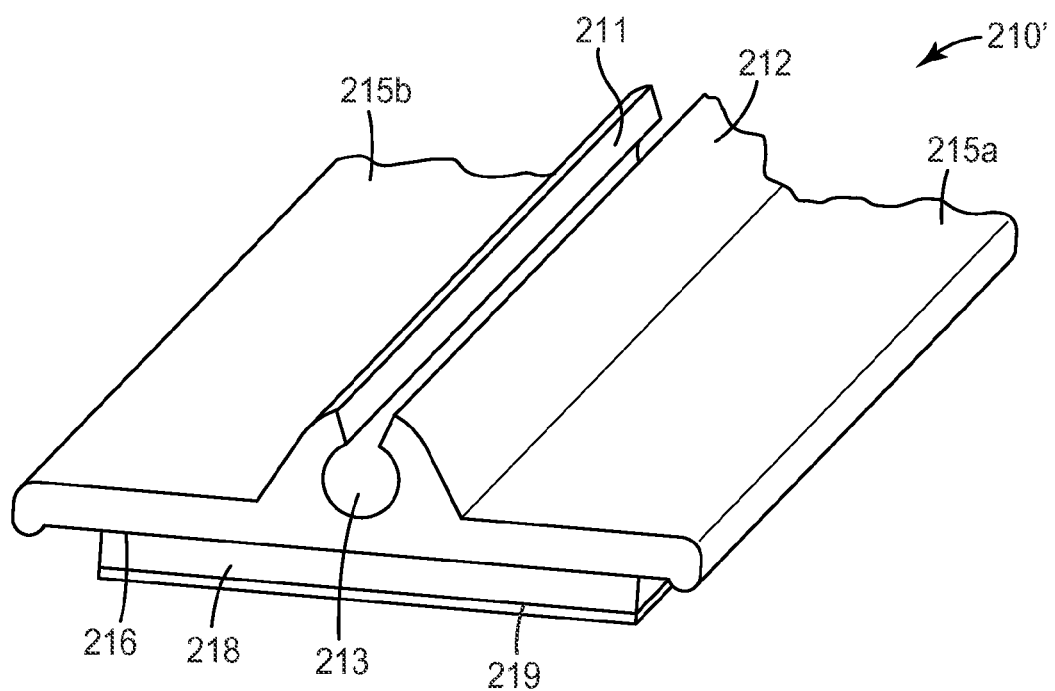
FIG. 9A is an isometric view of another exemplary duct according to another aspect of the invention.

Optionally, duct 210 can further include an open top or slot that runs the longitudinal length of the duct to provide access for inserting or removing the fiber(s). For example, as shown in FIG. 9A, alternative duct 210' includes a slot 211 configured to provide for the straightforward insertion of a drop fiber, such as drop fiber 207. The slot 211 can be formed during the extrusion process as a permanent slot or, alternatively, it can be formed in the factory or in the field using a cutting tool to provide a longitudinal opening in the duct. The tool can be applied to an empty duct or a duct that is pre-populated with one or more communication lines (e.g., drop fiber(s), such as drop fiber 207). In a further alternative, slot 211 runs only a portion of the longitudinal length of the duct 210'. Thus, a communication line can be easily inserted into or removed from duct 210'.

In one aspect, the slot opening 211 has a size of about 50% or less of the communication line/drop fiber outer diameter. In another aspect, the slot opening has a size of from about 10% to about 50% of the communication line/drop fiber outer diameter. For example, in some applications, a communication line can be inserted in slot 211 such that a portion of the line is visible after insertion. In another example, for other applications, for a smaller slot opening (e.g., the sides of the slot can be touching after insertion of the communication line), a communication line can be inserted in slot 211 such that the communication line is not visible after insertion.

In a further alternative, duct 210 (or 210') can also include a strength member, such as an aramid string (e.g., a woven or non-woven Kevlar™ material) or aramid yarn that can be bonded or un-bonded, such as those described U.S. Pat. Application No. 61/354,519, incorporated by reference herein in its entirety. The strength member can be disposed along the length of the duct between bottom surface 216 and adhesive layer 218.

A drop cable can be disposed within duct 210 and can be accessed and connected to the service line(s) at the access box 150 (see FIG. 2) or the base unit 180. In one aspect, the drop cable comprises a tight bend radius, 900 µm buffered optical fiber. Such an optical fiber cable is commercially available as DrakaElite™ BendBright XS Single Mode Optical Fiber, from Draka Communications. Also in this aspect, an exemplary drop cable comprises a 2.9 mm jacketed drop cable commercially available as ez Patch™ cabling and ez Drop™ cabling from Draka Communications, or blown fiber cabling. In another alternative aspect, the exemplary drop cable can comprise a micro-module, such as is commercially available from Acome, that includes a plurality, e.g., four, 250 µm fibers disposed in a tube that allows for management of the multiple fibers together. A coupling or adapter can be used in the access box 150 to connect the telecommunications service line to the drop fiber(s). In an exemplary aspect, the telecommunications fiber is field terminated with an optical fiber connector, such as described in U.S. Pat. No. 7,369,738. Other optical fiber connectors, such as SC-APC, SC-UPC, LC, or MTP/MPO, can be utilized.

In another aspect, an alternative duct 310 is shown in FIG. 3C. Duct 310 can include a bore 313 formed in the conduit portion 312. Duct 310 also includes a wing-shaped flange structure having a first flange 315a and a second flange 315b, both laterally extending from the conduit portion 312, to provide support for the duct 310 as it is installed on or fastened to a wall or other generally flat surface. The duct 310 includes a rear surface 316 that has a generally flat surface shape. In addition, duct 310 includes dual recess portions 317 formed between the conduit portion 312 and the flanges 315a, 315b to provide further duct flexibility for corner bending. In this particular aspect, conduit portion 312 is formed centrally with respect the flange wings and with respect to the plane of the wing-shaped flanges 315a, 315b. The flanges 315a, 315b and surface 316 can be formed in the same manner as described above. As shown in FIG. 3C, an adhesive backing 318 with a removable liner 319 is disposed on surface 316. In use, the liner can be removed and the surface 316 can be applied to a mounting surface via adhesive 318.

Figure 3D:
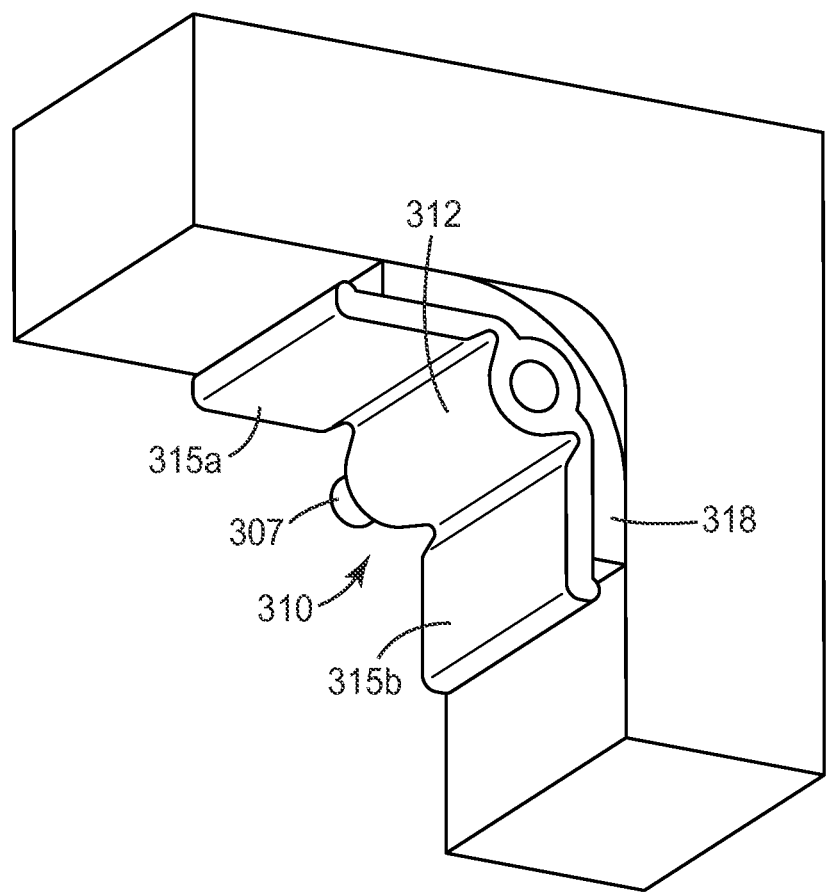
FIG. 3D is a partial view of the exemplary duct of FIG. 3B installed in a corner location according to another aspect of the invention.

FIG. 3D shows a partial view of exemplary duct 310 in use, where duct 310 is mounted at a corner location, and carries drop fiber 207 through the living unit. In this aspect, the recessed portions 317a, 317b provide further duct flexibility, where one flange 315a can be mounted on a ceiling and the other flange 315b can be mounted on a perpendicular side wall via adhesive backing 318.

Figure 4A:
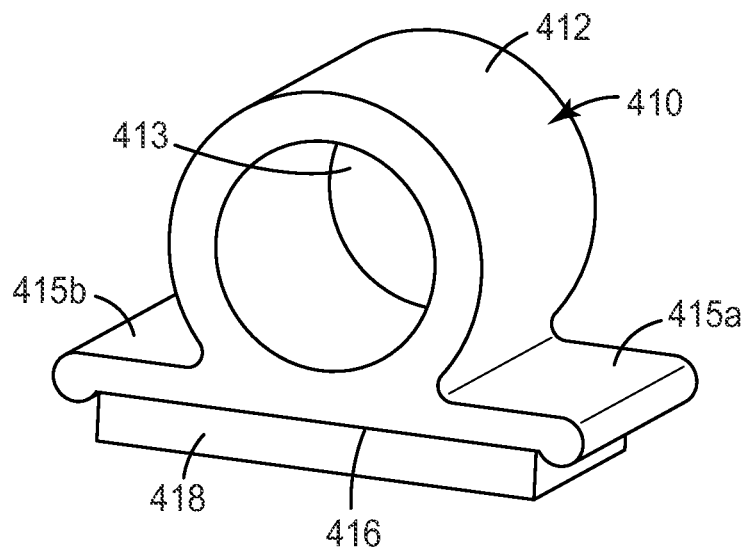
FIGS. 4A, 4B, and 4C are isometric views of alternative ducts according to other aspects of the invention.
Figure 4B:
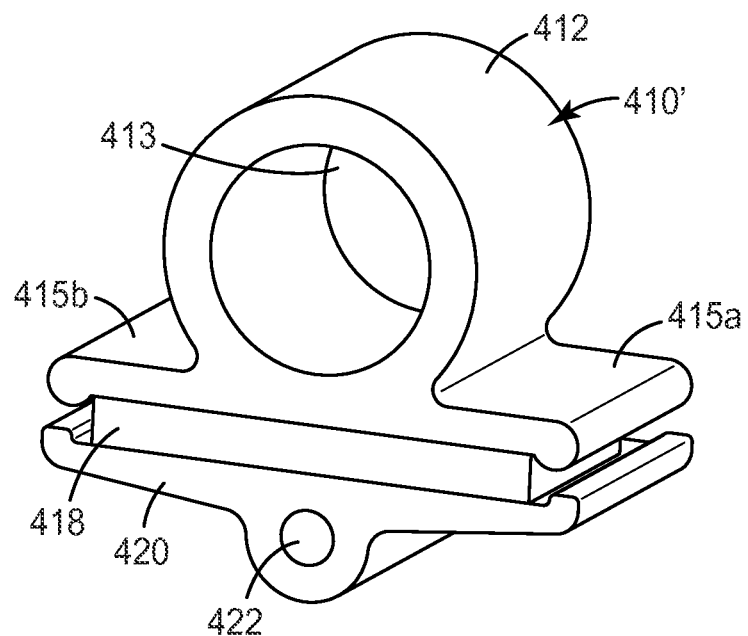

FIGS. 4A and 4B show views of alternative ducts 410 and 410'. In the alternative aspect shown in FIG. 4A, duct 410 can include a bore 413 formed in the conduit portion 412. Duct 410 also includes a flange structure having a first flange 415a and a second flange 415b to provide support for the duct 410 as it is installed on or fastened to a wall or other generally flat surface. In this aspect, the flanges 415a, 415b do not extend laterally as far as the flanges for ducts 210 and 310, giving the duct 410 an omega-shaped cross section. The duct 410 includes a bottom or rear surface 416 that has a generally flat surface shape. An adhesive backing 418 (optionally with a removable liner 419) can be disposed on surface 416.

FIG. 4B shows an alternative duct 410'. Duct 410' is shaped similarly to duct 410 and additionally includes a support duct 420 extending at least partially along the longitudinal length of the main duct that can be utilized to provide structural support to duct 410' when the duct is used in a free span. In particular, support duct 420 is coupled to the main duct by attaching to the opposite side of adhesive backing 418. In addition, the support duct 420 includes a strength member channel 422 disposed centrally and extending lengthwise therethrough. The strength member channel 422 can include a strength member, such as an aramid yarn, metallic wire, fiberglass member, or Kevlar material that enables the duct 410' to be supported without having to attach that portion of the duct to a wall or other surface. Alternatively, channel 422 can be utilized to carry an electrical wire therein.

Figure 9B:
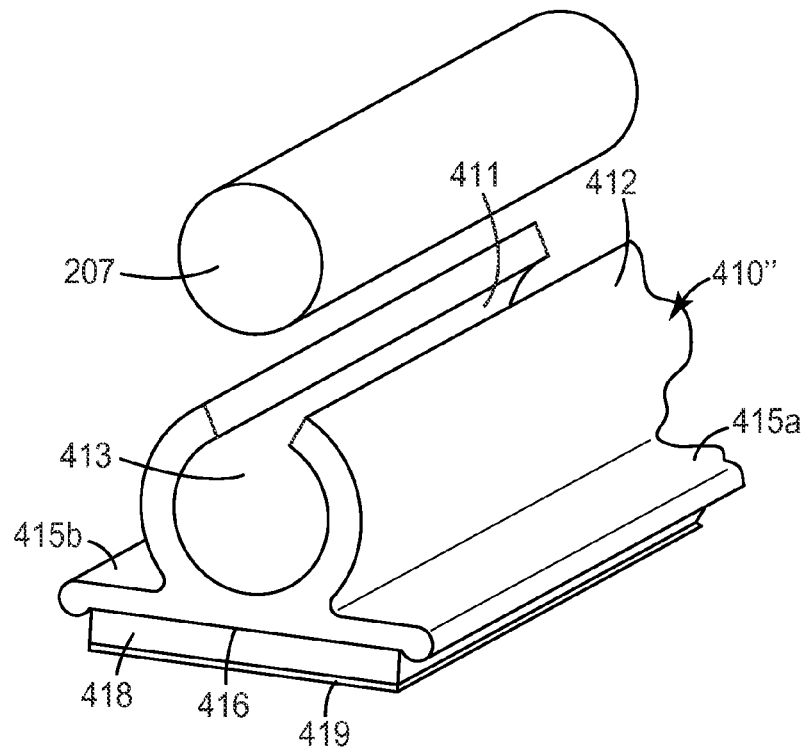
FIGS. 9B and 9C are different views of an alternative duct according to another aspect of the invention.
Figure 9C:
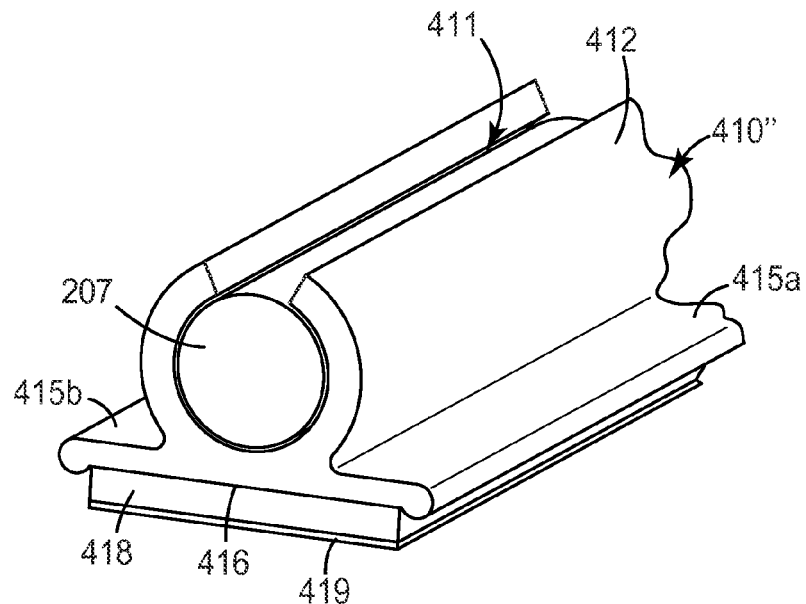

Optionally, duct 410 can further include a slot that runs the longitudinal length of the duct to provide access for inserting or removing the fiber(s). For example, as shown in FIG. 9B, alternative duct 410" includes a slot 411 configured to provide for the straightforward insertion of a drop fiber, such as drop fiber 207. FIG. 9C shows drop fiber 207 inserted within duct 410".

In a further alternative, duct 410 (or 410") can also include a strength member, such as an aramid string or aramid yarn, such as those described above, disposed along the length of the duct between bottom surface 216 and adhesive layer 218.

Figure 4C:
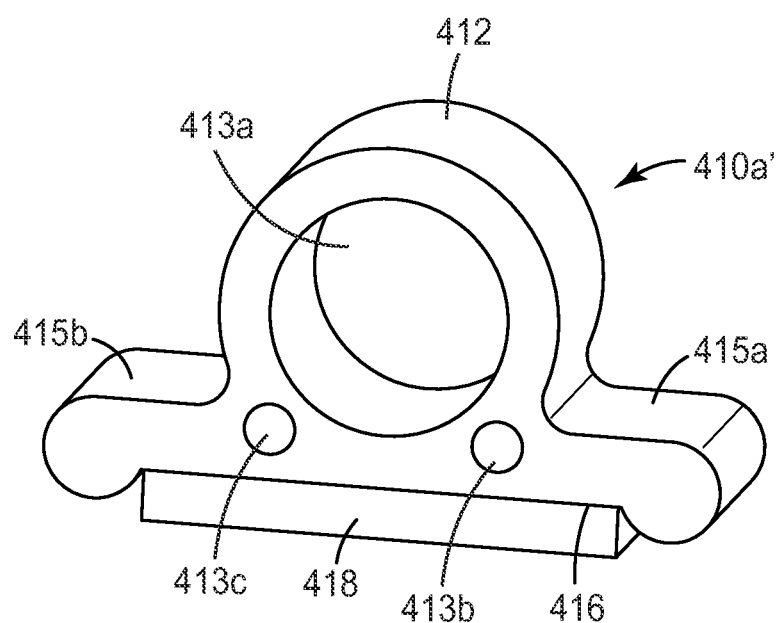

In a further aspect, alternatively, in FIG. 4C the duct 410a' can include multiple conduits, in this example conduit 412 includes a first bore 413a, whereas second lengthwise bore 413b and third lengthwise bore 413c, each formed in the main duct body, provide a second conduit and a third conduit. One or more optical fibers can be disposed in the first bore 413a, while strength members, such as aramid yarn, metallic wire, fiberglass member, or Kevlar material, can be disposed in the second and third conduits. The flange structure and adhesive backing can be similar to that described previously with respect to FIG. 4A.

Figure 5A:
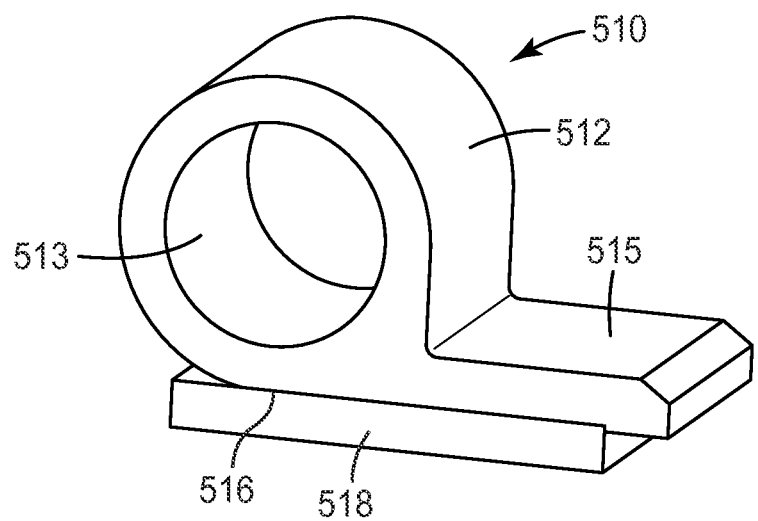
FIGS. 5A and 5B are isometric views of alternative ducts according to other aspects of the invention.
Figure 5B:
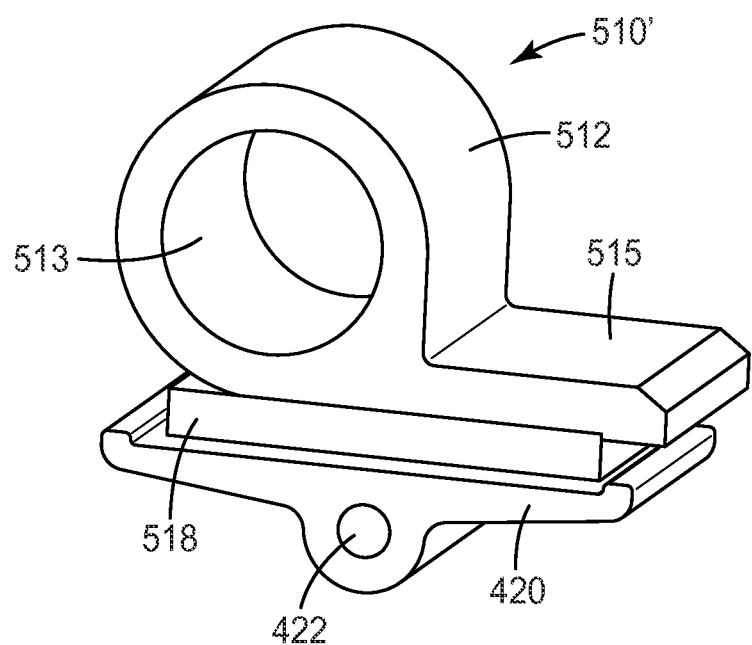

In another alternative aspect, FIGS. 5A and 5B show views of alternative ducts 510 and 510'. In the alternative aspect shown in FIG. 5A, duct 510 can include a bore 513 formed in the conduit portion 512. In this aspect, duct 510 includes a single-sided flange 515 or similar flattened portion to provide support for the duct 510 as it is installed on or fastened to a wall or other generally flat surface. The duct 510 includes a rear surface 516 that has a generally flat surface shape. An adhesive backing 518 (optionally with a removable liner—not shown) can be disposed on surface 516 of duct 510.

FIG. 5B shows an alternative duct 510'. Duct 510' is shaped similarly to duct 510 and additionally includes a support duct 420, similar to that described above with respect to FIG. 4B. In particular, support duct 420 is coupled to duct 510 by attaching to the opposite side of adhesive backing 518. In addition, the support duct 420 includes a strength member channel 422 disposed centrally and extending lengthwise therethrough to provide support for free span applications. In further alternative aspects, each of ducts 210 and 310 can include a support duct 420 attached in a similar manner.

Figure 6A:
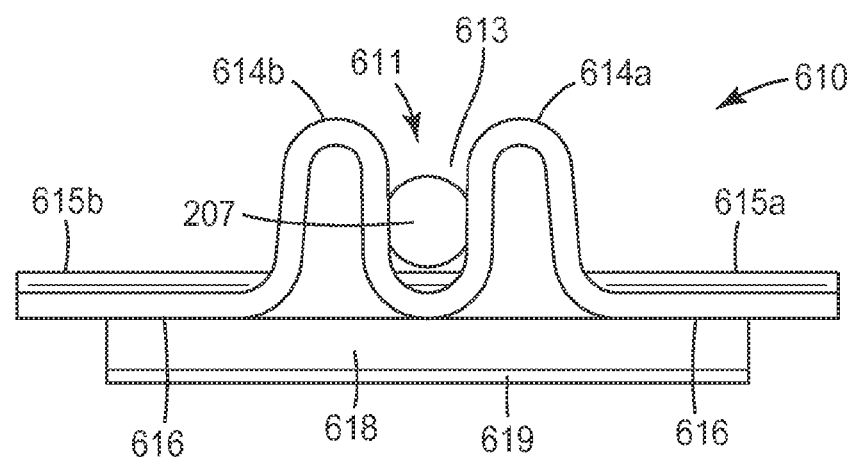
FIGS. 6A and 6B are different views of an alternative duct according to another aspect of the invention.
Figure 6B:
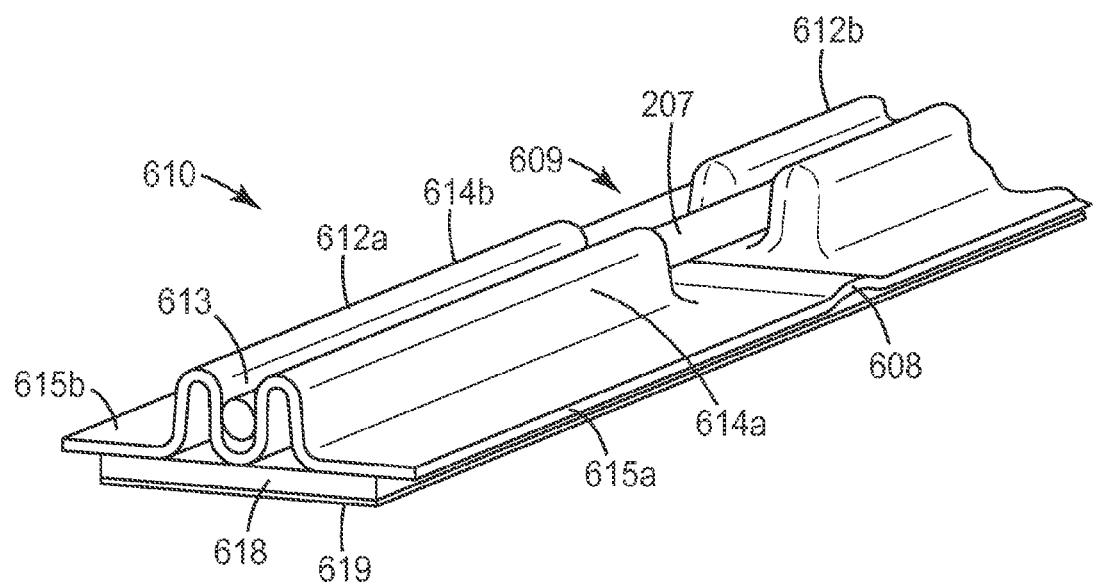

In a further alternative aspect, FIG. 6A shows a cross section view and FIG. 6B shows an isometric view of an alternative duct 610. Duct 610 includes an open conduit portion, with a main fiber channel 613 formed between opposing walls 614a and 614b. The main fiber channel 613 has a width that corresponds to a width slightly less that the diameter of a drop fiber 207, such as a 900 µm buffered optical fiber. The opening 611 of the main fiber channel 613 is configured to receive the drop fiber 207 and the opposing side walls 614a and 614b are configured to provide some flexibility so that the drop fiber 207 can snugly fit within main fiber channel. Duct 610 also includes a flange structure having a first flange 615a and a second flange 615b to provide support for the duct 610 as it is installed on or fastened to a wall or other generally flat surface, such as a wall. In this aspect, the flange extends along the longitudinal axis of the duct and extends outward (in a wing shape) in both lateral directions. In a preferred aspect, the duct 610 includes a rear surface 616 that has a generally flat surface shape to receive an adhesive backing 618 having a removable liner 619. Duct 610 can be formed from a clear or translucent polymeric material, such as a polycarbonate, making it less visible, while retaining flexibility and robustness. The adhesive 618 can also be formed from a clear material.

As is shown in FIG. 6B, duct 610 can be provided in segmented form. For example, duct segments 612a and 612b are shown in FIG. 6B. An opening 609 can be formed between each duct segment. In addition, at the segment opening, the flange structure can include a raised surface or bump 608 extending laterally across the fiber axis to provide for easier bending of the entire duct at certain mounting locations. In other alternative aspects, the longitudinal length of the duct segments (and the segment openings) can be longer or shorter, depending on the application.

Figure 10:
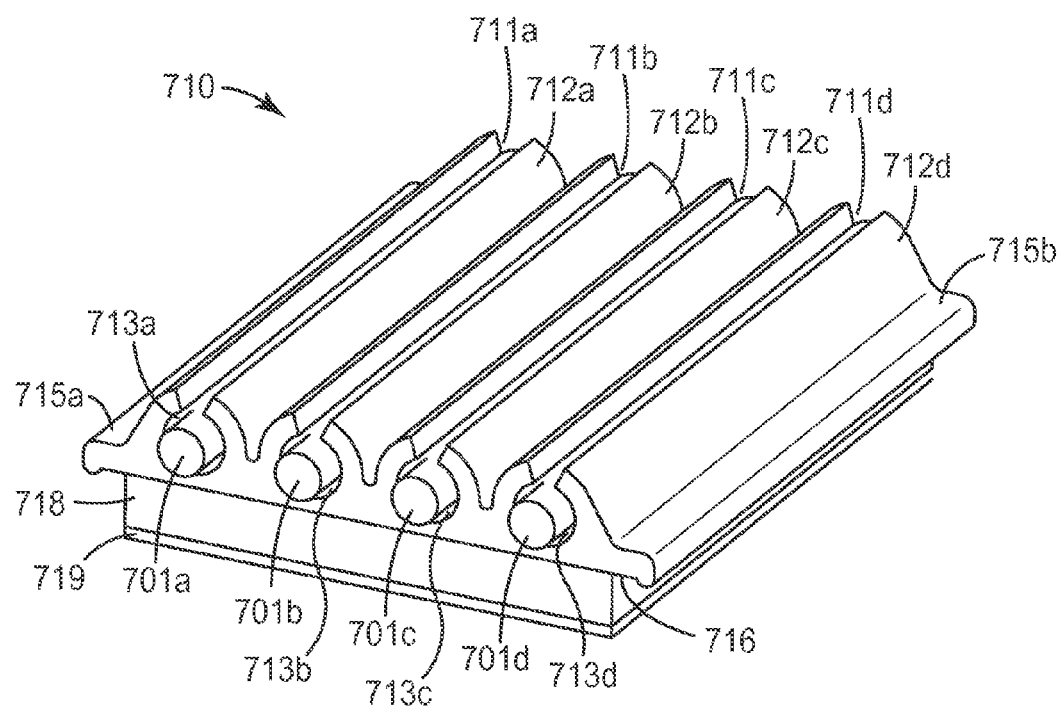
FIG. 10 is an isometric view of another exemplary duct according to another aspect of the invention.

In a further alternative, an exemplary duct includes at least one additional conduit, where the first conduit is configured to contain at least a first communication line and the additional conduit is configured to contain at least a second communication line. For example, as shown in FIG. 10, duct 710 that is utilized to carry multiple communication lines individually in separate conduit portions 712a-712d, each having a bore 713a-713d configured to house an individual line 701a-701d. The communication lines can be optical fibers, such as drop fibers, or electrical wires. In one aspect, each of the bores is sized such that the inner diameter of the bore is slightly larger than the outer diameter of the communication line disposed therein.

Duct 710 also includes a flange structure having a first flange 715a and a second flange 715b, both laterally extending from the conduit portions to provide support for the duct 710 as it is installed on a wall or other mounting surface. The duct 710 includes a rear surface 716 that has a generally flat surface shape. Optionally, duct 710 can further include one or more slots that run the longitudinal length of the duct to provide access for inserting or removing the communication lines. For example, as shown in FIG. 10, alternative duct 710 can include slots 711a-711d each configured to provide for the straightforward insertion/removal of drop fibers, such as drop fibers 701a-701d. In a further aspect, one or more strength members can be disposed between the bottom surface 716 and adhesive layer 718.

The configuration of duct 710 can be particularly useful for living units in countries where multiple communication lines are required—the fiber channels or separate conduits can allow for straightforward installation. In a related aspect, different communication lines within duct 710 can be associated with different service providers.

Figure 11A:
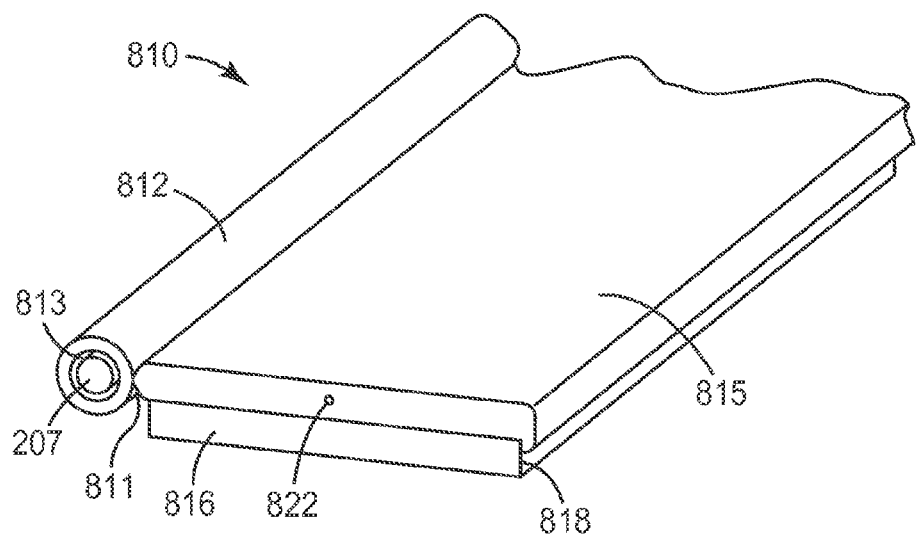
FIG. 11A is an isometric view of another exemplary duct according to another aspect of the invention.

In another alternative aspect, FIG. 11A shows a view of alternative duct 810. In the alternative aspect shown in FIG. 11A, duct 810 can include a bore 813 formed in the conduit portion 812. In this aspect, duct 810 includes a flange structure having a single-sided flange 815 or similar flattened portion to provide support for the duct 810 as it is installed on a wall or other generally flat surface. In this configuration, conduit portion 812 is attached to flange 815 via a thin web of material, or neck 811. The neck 811 has a thickness such that upon modest application of a peeling force, a segment of the conduit portion 812 can be detached or peeled away from the flange 815. In this example, the neck 811 can have a thickness of from about 10% to about 30% of the thickness of the flange 815. With this configuration, the telecommunication line (or multiple telecommunication lines) disposed in bore 813 resides in the same bending plane as the flange 815, such as when placed in spool form prior to installation. In this example, a drop fiber 207, e.g., a 900 µm buffered fiber, is disposed in bore 813. Optionally, a strength member, such as aramid (e.g., Kevlar) yarn, can also be disposed in bore 813.

The duct 810 can be formed from the same materials as described above with respect to the other alternative ducts.

Figure 11B:
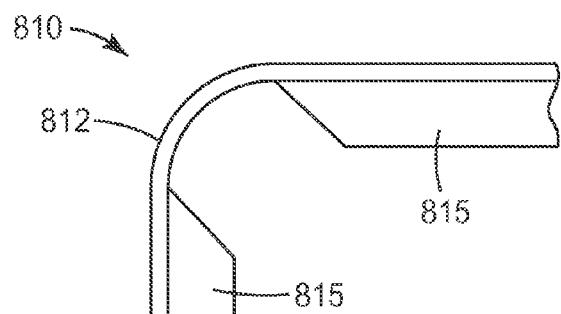
FIG. 11B is a top view of the exemplary duct of FIG. 11A having a right angle, in-plane bend.

In addition, the configuration of duct 810 can make in-plane turns and bends of any angle more straightforward. For example, as shown in FIG. 11B, duct 810 can be placed at a right angle, in-plane turn on a wall surface by separating conduit 812 from flange 815 and removing a portion of flange 815 at the bend location.

In a further alternative aspect, the conduit portion 812 can further include a metal wire disposed therein that retains its bent shape upon bending. This alternative configuration can allow for more straightforward bending around outer and inner corners, as the duct more easily holds its bent shape. In a further alternative, conduit portion 812 can further include a coaxial (e.g., micro-coaxial) wire or twisted wire pair.

Referring back to FIG. 11A, the duct 810 also includes a rear surface 816 that has a generally flat surface shape. An adhesive backing 818 (optionally with a removable liner—not shown) can be disposed on surface 816 of duct 810. The adhesive backing may be formed from any of the adhesives described above.

Optionally, duct 810 may further include a separate strength member channel 822. In another alternative aspect, duct 810 can include a strength member, such as an aramid string or aramid yarn, such as those described above, disposed along the length of the duct between bottom surface 816 and adhesive layer 818.

Figure 11C:
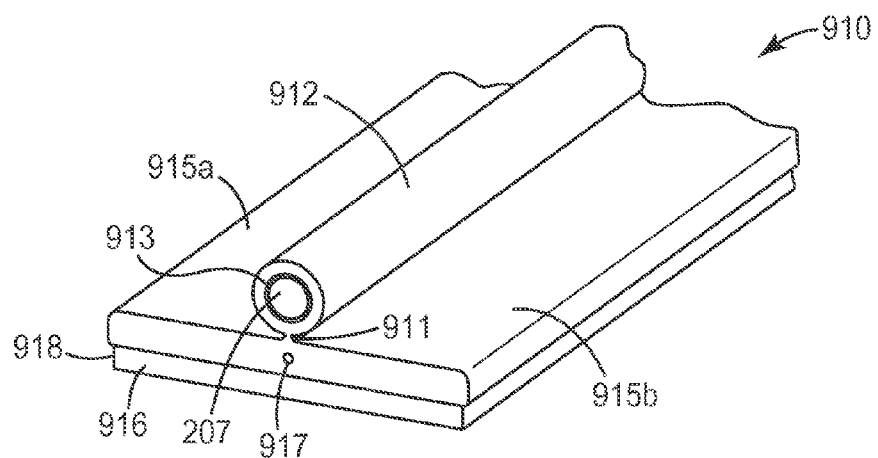
FIG. 11C is an isometric view of another exemplary duct according to another aspect of the invention.

FIG. 11C shows an alternative duct 910, that includes a bore 913 formed in the conduit portion 912. In this aspect, duct 910 includes a flange structure having a double-sided flange 915a, 915b or similar flattened portion to provide support for the duct 910 as it is installed on a wall or other generally flat surface. In this configuration, conduit portion 912 is attached to a central portion of flange structure 915a, 915b via a thin web of material, or neck 911. The neck 911 has a thickness such that upon modest application of a peeling force, a segment of the conduit portion 912 can be detached from the flange structure. In this example, the neck 911 can have a thickness of from about 10% to about 30% of the outer diameter of conduit portion 912. In this example, a drop fiber 207, e.g., a 900 µm buffered fiber, is disposed in bore 913. Optionally, a strength member, such as aramid (e.g., Kevlar) yarn, can also be disposed in bore 913.

The duct 910 can be formed from the same materials as described above with respect to the other alternative ducts.

In an alternative aspect, duct 910 can include multiple conduit portions disposed on flange structure 915a, 915b, with each conduit portion attached to the flange structure via a thin web of material such that each conduit portion can be detached from the flange structure upon the modest application of a peeling force.

Figure 11D:
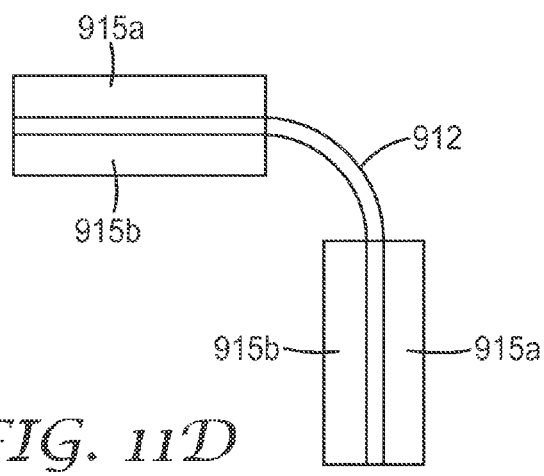
FIG. 11D is a top view of the exemplary duct of FIG. 11C having a right angle, in-plane bend.

In addition, the configuration of duct 910 can make in-plane turns and bends of any angle more straightforward. For example, as shown in FIG. 11D, duct 910 can be placed at a right angle, in-plane turn on a wall surface by separating conduit 912 from flange structure 915a, 915b and removing a portion of flange structure 915a, 915b at the bend location.

In a further alternative aspect, the conduit portion 912 can further include a metal wire that retains its bent shape upon bending. This alternative configuration can allow for more straightforward bending around outer and inner corners, as the duct more easily holds its bent shape. In a further alternative, conduit portion 812 can further include a coaxial (e.g., micro-coaxial) wire or twisted wire pair.

Referring back to FIG. 11C, the duct 910 also includes a rear surface 916 that has a generally flat surface shape. An adhesive backing 918 (optionally with a removable liner—not shown) can be disposed on surface 916 of duct 910. The adhesive backing may be formed from any of the adhesives described above.

Optionally, duct 910 may further include a separate strength member channel 922. In another alternative aspect, duct 910 can include a strength member, such as an aramid string or aramid yarn, such as those described above, disposed along the length of the duct between bottom surface 916 and adhesive layer 918.

Figure 12A:
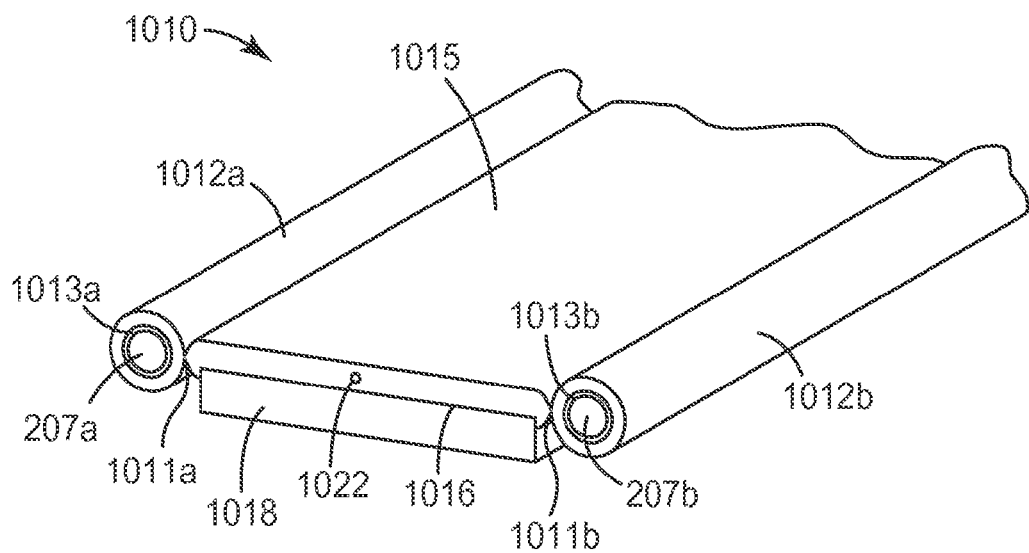
FIG. 12A is an isometric view of another exemplary duct according to another aspect of the invention.

In a further alternative aspect, FIG. 12A shows a view of alternative duct 1010. In the alternative aspect shown in FIG. 12A, duct 1010 includes dual conduits 1012a, 1012b having a flange structure 1015 disposed in between. A bore 1013a is formed in the conduit portion 1012a and a bore 1013b is formed in the conduit portion 1012b. In this aspect, duct 1010 includes a flange structure having a single flange 1015 or similar flattened portion disposed between the conduit portions to provide support for the duct 1010 as it is installed on a wall or other generally flat surface. In this configuration, conduit portions 1012a and 1012b are attached to flange 1015 via thin webs of material, or necks 1011a and 1011b. The necks 1011a and 1011b each have a thickness such that upon modest application of a peeling force, a segment of the conduit portions 1012a and/or 1012b can be detached or peeled away from the flange 1015. In this example, necks 1011a and 1011b can each have a thickness of from about 10% to about 30% of the thickness of the flange 1015. With this configuration, the telecommunication line (or multiple telecommunication lines) disposed in bores 1013a, 1013b each reside in the same bending plane as the flange 1015, such as when placed in spool form prior to installation. In this example, drop fibers 207a, 207b are disposed in bores 1013a, 1013b. Optionally, a strength member, such as aramid (e.g., Kevlar) yarn, can also be disposed in bores 1013a, 1013b. In a further alternative, duct 1010 can provide hybrid cabling, where conduit 1012a can carry a drop fiber, e.g., a 900 μm buffered fiber, or multiple fibers, and conduit 1012b can carry a coaxial cable or twisted wire pair.

The duct 1010 can be formed from the same materials as described above with respect to the other alternative ducts.

Figure 12B:
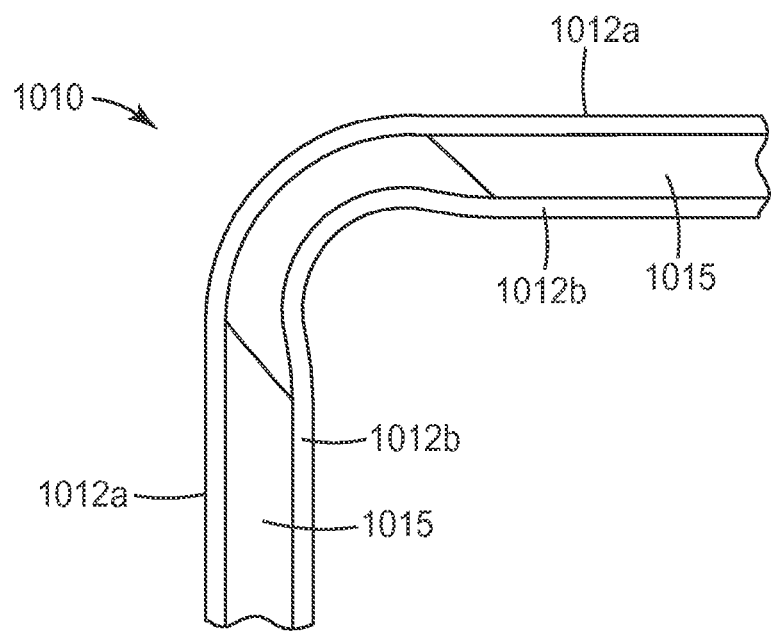
FIG. 12B is a top view of the exemplary duct of FIG. 12A having a right angle, in-plane bend.

In addition, the configuration of duct 1010 can make in-plane turns and bends of any angle more straightforward. For example, as shown in FIG. 12B, duct 1010 can be placed at a right angle, in-plane turn on a wall surface by separating conduits 1012a and 1012b from flange 1015 and removing a portion of flange 1015 at the bend location.

In a further alternative aspect, one or both of the conduit portions 1012a, 1012b can further include a metal wire disposed therein that retains its bent shape upon bending. This alternative configuration can allow for more straightforward bending around outer and inner corners, as the duct more easily holds its bent shape.

Referring back to FIG. 12A, the duct 1010 also includes a rear surface 1016 that has a generally flat surface shape. An adhesive backing 1018 (optionally with a removable liner—not shown) can be disposed on surface 1016 of duct 1010. The adhesive backing may be formed from any of the adhesives described above.

Optionally, duct 1010 may further include a separate strength member channel 1022. In another alternative aspect, duct 1010 can include a strength member, such as an aramid string or aramid yarn, such as those described above, disposed along the length of the duct between bottom surface 1016 and adhesive layer 1018.

In a further alternative aspect, the duct utilized within system 200 can comprise a low-profile, adhesive-backed fiber tape. This alternative duct can include a cover material that can be selected to provide flame resistance, such as V0 flame resistance for agency listing. The cover material can be a paintable material, or, in a further alternative, cover material may be covered with a decorative molding or wall paper. In this alternative aspect, the duct may be constructed in a similar manner to the adhesive-backed fiber tape described in U.S. Pat. No. 8,842,960, incorporated by reference herein in its entirety.

In a further alternative aspect, the duct may be substituted with a clear (substantially transparent) or translucent, pressure sensitive adhesive (PSA) tape, such as a model 8686 polyurethane protective tape, or a paint protection film SGH6 and SGH12 (available from 3M Company, St. Paul, Minn.), with a thickness of about 20 mils or less, preferably about 6 mils to about 8 mils. These tapes may have a clear, glassy, matte, or satin finish. This tape can be utilized to support a drop fiber having a clear buffer coating. The tape may be dispensed flat from a roll and can conform to the drop fiber as it is applied, where the drop fiber is disposed between the adhesive surface of the tape and the mounting wall or surface. In this manner, the drop fiber run from the point-of-entry unit to the wall receptacle can be barely visible.

While many of the ducts described herein are shown having a symmetrical shape, the duct designs can be modified to have an asymmetric shape (such as a flange wider on one side than the other), as would be apparent to one of skill in the art given the present description.

Moreover, the ducts described herein may be coextruded with at least two materials. A first material can exhibit properties that afford protection of the optical fibers within the conduit portion of each duct such as against accidental damage due to impact, compression, or even provide some protection against intentional misuse such as stapling. A second material can provide functional flexibility for cornering within a plane. The flange portion of the duct may be extruded of a lower durometer material that allows it to be easily formed around a corner while maintaining a planar surface for secure bonding and wetting of the adhesive to the wall. The material forming the external wall near the conduits can provide a way for straightforward access such as making a window cut for accessing the fibers.

In a further alternative aspect, the duct (e.g., duct 210) utilized within system 200 can comprise an extruded polymer material, such as those described above, that is loaded with cut-up or chopped strength member (e.g., aramid) pieces to provide against excessive localized stretching during the application process.

In some aspects, the ducts are typically extruded with a V0 flame resistant material, and can be of a material that is paintable, or in a further alternative, covered with another decorative material. In some applications, the ducts can often be filled with one or more 900 μm buffer coated bend insensitive fibers that comply with ITU 652-D, ITU 657-A and ITU 657-B standards, though other fibers may be used such as 500 μm coated fibers or 250 μm coated fibers.

The system and method described herein can be utilized for providing a final drop in a living unit in a building, such as an MDU. The system has a low profile and minimally impacts the aesthetics of the interior of the living unit, while providing protection for the drop fiber from mechanical and environmental damage. The system further enables the move to smaller desktop ONTs.

In addition, the exemplary ducts described herein can be further utilized in non-telecommunication applications. For example, the exemplary ducts described herein can be utilized for general wire routing within or outside a building/living unit, such as to route speaker/AV wires, power wires, and other signal wires.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A cable routing system comprising:
a main fiber channel configured to receive a drop fiber to allow it to fit within the main fiber channel, wherein the main fiber channel comprises a segmented duct having a fully open conduit portion with a longitudinal opening, the main fiber channel being discontinuous along its longitudinal axis, and the duct comprises a continuous flange structure to provide support for the system as it is installed on or fastened to a wall or other generally flat surface, and a continuous rear surface comprising a generally flat surface shaped to receive an adhesive backing having a removable liner, wherein the segmented duct can be bent around an inside corner and an outside corner.

2. The cable routing system of claim 1, wherein the flange structure comprises a raised surface or bump extending laterally across an axis of the fiber.

3. The cable routing system of claim 1, wherein the duct material comprising a clear or translucent polymer material that is flexible.

4. The cable routing system of claim 1, wherein the drop fiber that the fiber channel receives is a 900 micron optical fiber.

5. The cable routing system of claim 4, wherein the 900 micron optical fiber is buffered.

6. The cable routing system of claim 5, wherein the buffer coating of the 900 micron optical fiber is clear.

7. The cable routing system of claim 1, wherein the adhesive backing comprises a clear material.

8. The cable routing system of claim 1, wherein the adhesive backing comprises a removable adhesive.

9. The cable routing system of claim 8, wherein the adhesive backing comprises a stretch release adhesive.

10. The cable routing system of claim 1, wherein the drop fiber comprises a 500 micron buffered fiber.

11. The cable routing system of claim 1, wherein the drop fiber comprises a 250 microns buffered fiber.

12. The cable routing system of claim 1, wherein the drop fiber comprise a single mode optical fiber.

13. The cable routing system of claim 1, wherein the drop fiber comprises a multi-mode optical fiber.

14. The cable routing system of claim 1, wherein the drop fiber comprises a plastic optical fiber.

15. The cable routing system of claim 1, wherein the drop fiber is capable of being inserted and removed from the main fiber channel.

16. The cable routing system of claim 1, wherein the main fiber channel is defined by opposing flexible side walls.

17. The cable routing system of claim 1, wherein the longitudinal opening is configured to receive the drop fiber.

18. The cable routing system of claim 17, wherein the longitudinal opening is formed opposite the continuous rear surface.

* * * * *